United States Patent
Sahlhoff et al.

(10) Patent No.: US 9,946,007 B2
(45) Date of Patent: Apr. 17, 2018

(54) LIGHT GUIDE AND LIGHTING ASSEMBLY WITH ARRAY OF ROTATED MICRO-OPTICAL ELEMENTS

(71) Applicant: Rambus Delaware LLC, Brecksville, OH (US)

(72) Inventors: Dane A. Sahlhoff, Strongsville, OH (US); Greg Coghlan, Olmsted Falls, OH (US); Todd Winski, Hudson, OH (US); Kurt Starkey, Strongsville, OH (US)

(73) Assignee: Rambus Delaware LLC, Brecksville, OH (US)

( * ) Notice: Subject to any disclaimer, the term of this patent is extended or adjusted under 35 U.S.C. 154(b) by 0 days.

(21) Appl. No.: 14/571,931

(22) Filed: Dec. 16, 2014

(65) Prior Publication Data

US 2015/0309241 A1    Oct. 29, 2015

Related U.S. Application Data

(63) Continuation of application No. 14/535,860, filed on Nov. 7, 2014, now Pat. No. 9,703,031.
(Continued)

(51) Int. Cl.
| | |
|---|---|
| *F21V 8/00* | (2006.01) |
| *F21K 9/61* | (2016.01) |
| *F21Y 115/10* | (2016.01) |

(52) U.S. Cl.
CPC .............. *G02B 6/0036* (2013.01); *F21K 9/61* (2016.08); *G02B 6/002* (2013.01); *G02B 6/003* (2013.01);
(Continued)

(58) Field of Classification Search
CPC ...... G02B 6/0093; G02B 6/0036; G02B 6/38; G02B 6/004; G02B 6/0088; F21K 9/61
See application file for complete search history.

(56) References Cited

U.S. PATENT DOCUMENTS 5,845,038 A * 12/1998 Lundin et al. ................ 362/551
6,752,505 B2 * 6/2004 Parker et al. ................ 362/627
(Continued)

FOREIGN PATENT DOCUMENTS

| | | |
|---|---|---|
| CN | 102 621 624 | 8/2012 |
| WO | 2011133745 | 10/2011 |
| WO | 2012027441 | 3/2012 |

OTHER PUBLICATIONS

Extended European Search Report for related European Application No. 14199232.1, dated Oct. 2, 2015. 7 pages.
(Continued)

*Primary Examiner* — Elmito Breval
*Assistant Examiner* — Fatima Farokhrooz
(74) *Attorney, Agent, or Firm* — Renner, Otto, Boisselle & Sklar, LLP

(57) ABSTRACT

A light guide includes opposed major surfaces and a light input edge extending therebetween. An array of micro-optical elements of well-defined shape at at least one of the opposed major surfaces corresponds to the light input edge. Each of the micro-optical elements in the array includes a longitudinal axis arranged within the range of angles relative to the light input edge. A path linearly extending along the light guide from the light input edge intersects at least a portion of the micro-optical elements in the array, at least one of the micro-optical elements along the path arranged with its longitudinal axis at a positive angle relative to the light input edge, and at least another one of the micro-optical
(Continued)

elements along the path arranged with its longitudinal axis at a negative angle relative to the light input edge.

20 Claims, 10 Drawing Sheets

Related U.S. Application Data

(60) Provisional application No. 61/985,052, filed on Apr. 28, 2014, provisional application No. 62/032,057, filed on Aug. 1, 2014.

(52) U.S. Cl.
CPC ......... *G02B 6/0031* (2013.01); *G02B 6/0058* (2013.01); *F21Y 2115/10* (2016.08); *G02B 6/0021* (2013.01); *G02B 6/0061* (2013.01); *G02B 6/0063* (2013.01); *G02B 6/0068* (2013.01)

(56) References Cited

U.S. PATENT DOCUMENTS

| | | | |
|---|---|---|---|
| 9,703,031 B2 | 7/2017 | Sahlhoff et al. | |
| 2001/0053075 A1* | 12/2001 | Parker | F21V 11/00 362/617 |
| 2006/0068154 A1* | 3/2006 | Parce | B82Y 20/00 428/76 |
| 2007/0097710 A1 | 5/2007 | Chang et al. | |
| 2009/0257245 A1* | 10/2009 | Kim et al. | 362/626 |
| 2009/0316077 A1* | 12/2009 | Li et al. | 349/65 |
| 2011/0141551 A1* | 6/2011 | Uchida et al. | 359/316 |
| 2012/0281432 A1* | 11/2012 | Parker et al. | 362/609 |
| 2013/0194777 A1* | 8/2013 | Berben et al. | 362/84 |
| 2013/0322111 A1* | 12/2013 | Nishitani et al. | 362/603 |
| 2013/0333742 A1* | 12/2013 | Chang et al. | 136/244 |
| 2014/0009902 A1* | 1/2014 | Banin et al. | 362/19 |
| 2014/0092629 A1* | 4/2014 | Lin et al. | 362/607 |
| 2014/0098566 A1 | 4/2014 | Starkey et al. | |
| 2014/0104880 A1* | 4/2014 | Yang et al. | 362/611 |
| 2015/0029744 A1* | 1/2015 | Van Ostrand | G02B 5/0231 362/606 |
| 2016/0033704 A1 | 2/2016 | Sahlhoff et al. | |
| 2016/0033712 A1 | 2/2016 | Sahlhoff et al. | |
| 2016/0091652 A1 | 3/2016 | Sahlhoff | |

OTHER PUBLICATIONS

Co-pending related U.S. Appl. No. 14/535,860, filed Nov. 7, 2014.
Co-pending related U.S. Appl. No. 15/619,847, filed Jun. 12, 2017, and current claims.

* cited by examiner

LIGHT GUIDE AND LIGHTING ASSEMBLY WITH ARRAY OF ROTATED MICRO-OPTICAL ELEMENTS

RELATED APPLICATION DATA

This application is a continuation of U.S. application Ser. No. 14/535,860, filed Nov. 7, 2014, which claims the benefit of U.S. Provisional Patent Application No. 61/985,052, filed Apr. 28, 2014, and claims the benefit of U.S. Provisional Patent Application No. 62/032,057, filed Aug. 1, 2014, the disclosures of which are incorporated herein by reference in their entireties.

BACKGROUND

Light emitting diodes (LEDs) show promise as an energy efficient light source for lighting assemblies. For some LED-based lighting assemblies, the light emitted from the light source is input to a light guide and light extracting elements specularly extract the light from the light guide in a defined direction. But these light extracting elements also provide an optically-specular path through which the light source is visible to a viewer. Reducing the visibility of the light source while maintaining the directional, specular light output is desirable in many applications for maximum application efficiency.

DESCRIPTION

Figure 1:
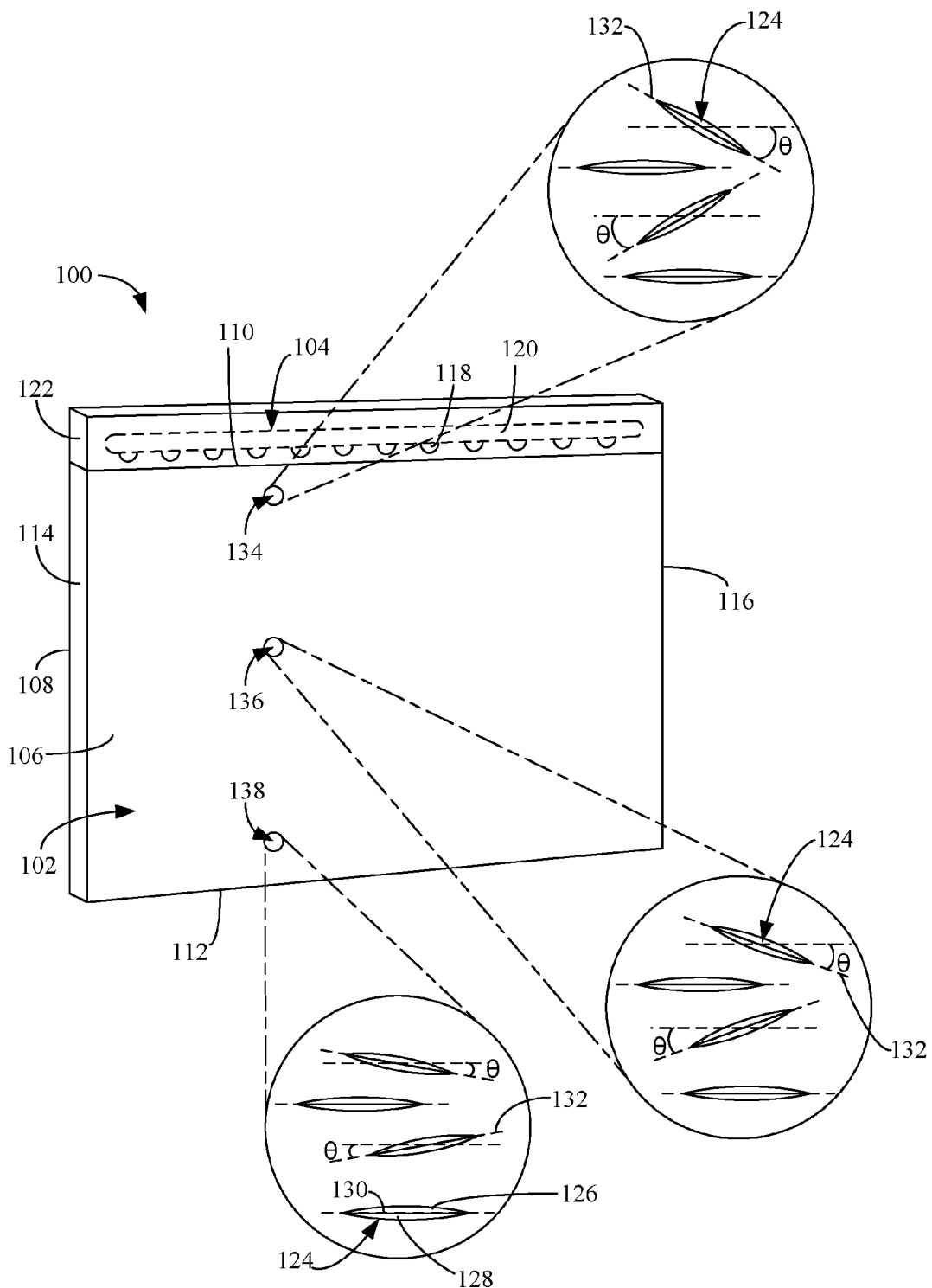
FIG. 1 is a schematic perspective view of an exemplary lighting assembly.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments. In this disclosure, angles of incidence, reflection, and refraction and output angles are measured relative to the normal to the surface.

In accordance with one aspect of the present disclosure, a light guide includes opposed major surfaces between which light propagates by total internal reflection. A light input edge extends between the major surfaces in a thickness direction through which light is input into the light guide. An array of micro-optical elements of well-defined shape is at at least one of the opposed major surfaces, the array of micro-optical elements corresponding to the light input edge, each of the micro-optical elements in the array having a longitudinal axis arranged within the range of +45° to −45° relative to the light input edge. A path linearly extending along the light guide from the light input edge intersects at least a portion of the micro-optical elements in the array, at least one of the micro-optical elements along the path arranged with the longitudinal axis thereof at a positive angle relative to the light input edge, and at least another one of the micro-optical elements along the path arranged with the longitudinal axis thereof at a negative angle relative to the light input edge.

In accordance with another aspect of the present disclosure, a lighting assembly includes a light guide and a light source. The light guide is configured to propagate light by total internal reflection, the light guide including opposed major surfaces and a light input edge extending between the major surfaces in a thickness direction through which light is input into the light guide. The light source is located adjacent the light input edge to edge light the light guide. An array of micro-optical elements of well-defined shape is at at least one of the opposed major surfaces, the array of micro-optical elements corresponding to the light source, each of the micro-optical elements in the array comprising a longitudinal axis arranged within the range of +45° to −45° relative to the light input edge. A path linearly extending along the light guide from the light input edge intersects at least a portion of the micro-optical elements in the array, at least one of the micro-optical elements along the path arranged with the longitudinal axis thereof at a positive angle relative to the light input edge, and at least another one of the micro-optical elements along the path arranged with the longitudinal axis thereof at a negative angle relative to the light input edge.

In accordance with another aspect of the present disclosure, a lighting assembly includes a light guide and a light source. The light guide is configured to propagate light by total internal reflection, the light guide comprising opposed major surfaces and a light input edge extending between the major surfaces in a thickness direction through which light is input into the light guide, a tangent of at least part of the light input edge extending in a direction orthogonal to the thickness direction. The light source is located adjacent the light input edge to edge light the light guide. An array of micro-optical elements of well-defined shape is at at least one of the opposed major surfaces, the array of micro-optical elements corresponding to the light source, each of the micro-optical elements in the array comprising a longitudinal axis arranged within the range of +45° to −45° relative to the tangent of the light input edge. A path linearly extending along the light guide from the light input edge intersects at least a portion of the micro-optical elements of the array, at least one of the micro-optical elements along the path arranged with the longitudinal axis thereof at a positive angle relative to the tangent of the light input edge, and at least another one of the micro-optical elements along the path arranged with the longitudinal axis thereof at a negative angle relative to the tangent of the light input edge.

With initial reference to FIG. 1, an exemplary embodiment of a lighting assembly is shown at 100. The lighting assembly 100 includes a light guide 102. The light guide 102 is a solid article of manufacture made from, for example, polycarbonate, poly(methyl-methacrylate) (PMMA), glass, or other appropriate material. The light guide 102 may also be a multi-layer light guide having two or more layers that may differ in refractive index. The light guide 102 includes a first major surface 106 and a second major surface 108 opposite the first major surface 106. The light guide 102 is configured to propagate light by total internal reflection between the first major surface 106 and the second major surface 108. The length and width dimensions of each of the major surfaces 106, 108 are greater, typically ten or more times greater, than the thickness of the light guide 102. The thickness is the dimension of the light guide 102 in a direction orthogonal to the major surfaces 106, 108. The thickness of the light guide 102 may be, for example, about 0.1 millimeters (mm) to about 10 mm.

At least one edge surface extends between the major surfaces 106, 108 of the light guide in the thickness direction. The total number of edge surfaces depends on the configuration of the light guide. In the case where the light guide is rectangular, the light guide has four edge surfaces 110, 112, 114, 116. Other light guide shapes result in a corresponding number of side edges. Although not shown, in some embodiments, the light guide 102 may additionally include one or more edge surfaces defined by the perimeter of an orifice extending through the light guide in the thickness direction. Each edge surface defined by the perimeter of an orifice extending through the light guide 102 will hereinafter be referred to as an internal edge surface. Depending on the shape of the light guide 102, each edge surface may be straight or curved, and adjacent edge surfaces may meet at a vertex or join in a curve. Moreover, each edge surface may include one or more straight portions connected to one or more curved portions. The edge surface through which light from the light source 104 is input to the light guide will now be referred to as a light input edge. In the embodiment shown in FIG. 1, the edge surface 110 is a light input edge. In some embodiments, the light guide 102 includes more than one light input edge. Furthermore, the one or more light input edges may be straight and/or curved.

In the illustrated embodiment, the major surfaces 106, 108 are planar. In other embodiments, at least a portion of the major surfaces 106, 108 of the light guide 102 is curved in one or more directions. In one example, the intersection of the light input edge 110 and one of the major surfaces 106, 108 defines a first axis, and at least a portion of the light guide 102 curves about an axis orthogonal to the first axis. In another example, at least a portion of the light guide 102 curves about an axis parallel to the first axis. Exemplary shapes of the light guide include a dome, a hollow cylinder, a hollow cone or pyramid, a hollow frustrated cone or pyramid, a bell shape, an hourglass shape, or another suitable shape.

The lighting assembly 100 includes a light source 104 positioned adjacent the light input edge 110. The light source 104 is configured to edge light the light guide 102 such that light from the light source 104 enters the light input edge 110 and propagates along the light guide 102 by total internal reflection at the major surfaces 106, 108.

The light source 104 includes one or more solid-state light emitters 118. The solid-state light emitters 118 constituting the light source 104 are arranged linearly or in another suitable pattern depending on the shape of the light input edge 110 of the light guide 102 to which the light source 104 supplies light.

Exemplary solid-state light emitters 118 include such devices as LEDs, laser diodes, and organic LEDs (OLEDs). In an embodiment where the solid-state light emitters 118 are LEDs, the LEDs may be top-fire LEDs or side-fire LEDs, and may be broad spectrum LEDs (e.g., white light emitters) or LEDs that emit light of a desired color or spectrum (e.g., red light, green light, blue light, or ultraviolet light), or a mixture of broad-spectrum LEDs and LEDs that emit narrow-band light of a desired color. In one embodiment, the solid-state light emitters 118 emit light with no operably-effective intensity at wavelengths greater than 500 nanometers (nm) (i.e., the solid-state light emitters 118 emit light at wavelengths that are predominantly less than 500 nm). In some embodiments, the solid-state light emitters 118 constituting light source 104 all generate light having the same nominal spectrum. In other embodiments, at least some of the solid-state light emitters 118 constituting light source 104 generate light that differs in spectrum from the light generated by the remaining solid-state light emitters 118. For example, two different types of solid-state light emitters 118 may be alternately located along the light source 104.

Each solid-state light emitter 118 emits light at a light ray angle distribution relative to an optical axis 119 (FIGS. 2 and 4) of the solid-state light emitter 118. The optical axis 119 is defined as an axis extending orthogonally from the center of the light emitting surface of the solid state light emitter 118. The solid-state light emitter 118 may be arranged so that the optical axis 119 is perpendicular to the light input edge 110.

The lighting assembly 100 may include one or more additional components. For example, although not specifically shown in detail, in some embodiments of the lighting assembly, the light source 104 includes structural components to retain the solid-state light emitters 118. In the examples shown in FIG. 1, the solid-state light emitters 118 are mounted to a printed circuit board (PCB) 120. The light source 104 may additionally include circuitry, power supply, electronics for controlling and driving the solid-state light emitters 118, and/or any other appropriate components.

The lighting assembly 100 may additionally include a housing 122 for retaining the light source 104 and the light guide 102. The housing 122 may retain a heat sink or may itself function as a heat sink. In some embodiments, the lighting assembly 100 includes a mounting mechanism (not shown) to mount the lighting assembly to a retaining structure (e.g., a ceiling, a wall, etc.).

The lighting assembly 100 may additionally include a reflector (not shown) adjacent one of the major surfaces 106, 108. The light extracted through the major surface adjacent the reflector may be reflected by the reflector, re-enter the light guide 102 at the major surface, and be output from the light guide 102 through the other major surface.

The light guide 102 includes light extracting elements embodied as micro-optical elements 124 in, on, or beneath at least one of the major surfaces 106, 108. Micro-optical elements that are in, on, or beneath a major surface will be referred to as being "at" the major surface. The micro-optical elements 124 are features of well-defined shape that predictably reflect or refract the light propagating in the light guide 102. In some embodiments, at least one of the micro-optical elements 124 is an indentation in the major surface 106, 108 of well-defined shape. In other embodiments, at least one of the micro-optical elements 124 is a protrusion from the major surface 106, 108 of well-defined shape.

A micro-optical element of well-defined shape is a three-dimensional feature recessed into a major surface or protruding from a major surface having distinct surfaces on a scale larger than the surface roughness of the major surfaces 106, 108. Micro-optical elements and micro-features of well-defined shape exclude features of indistinct shape or surface textures, such as printed features of indistinct shape, ink jet printed features of indistinct shape, selectively-deposited features of indistinct shape, and features of indistinct shape wholly formed by chemical etching or laser etching.

Light guides having micro-optical elements are typically formed by a process such as injection molding. The light-extracting elements are typically defined in a shim or insert used for injection molding light guides by a process such as diamond machining, laser micromachining, photolithography, or another suitable process. Alternatively, any of the above-mentioned processes may be used to define the light-extracting elements in a master that is used to make the shim or insert. In other embodiments, light guides without micro-optical elements are typically formed by a process such as injection molding or extruding, and the light-extracting elements are subsequently formed on one or both of the major surfaces by a process such as stamping, embossing, or another suitable process.

Each micro-optical element 124 functions to disrupt the total internal reflection of the light propagating in the light guide and incident thereon. In one embodiment, the micro-optical elements 124 reflect light toward the opposing major surface so that the light exits the light guide 102 through the opposing major surface. Alternatively, the micro-optical elements 124 transmit light through the micro-optical elements 124 and out of the major surface of the light guide 102 having the micro-optical elements 124. In another embodiment, both types of micro-optical elements 124 are present. In yet another embodiment, the micro-optical elements 124 reflect some of the light and refract the remainder of the light incident thereon. Therefore, the micro-optical elements 124 are configured to extract light from the light guide 102 through one or both of the major surfaces 106, 108.

The micro-optical elements 124 are configured to extract light in a defined intensity profile (e.g., a uniform intensity profile) and with a defined light ray angle distribution from one or both of the major surfaces 106, 108. In this disclosure, intensity profile refers to the variation of intensity with regard to position within a light-emitting region (such as the major surface or a light output region of the major surface). The term light ray angle distribution is used to describe the variation of the intensity of light with ray angle (typically a solid angle) over a defined range of light ray angles. In an example in which the light is emitted from an edge-lit light guide, the light ray angles can range from $-90°$ to $+90°$ relative to the normal to the major surface.

Micro-optical elements 124 are small relative to the linear dimensions of the major surfaces 106, 108. The smaller of the length and width of a micro-optical element 124 is less than one-tenth of the longer of the length and width (or circumference) of the light guide 102 and the larger of the length and width of the micro-optical element 124 is less than one-half of the smaller of the length and width (or circumference) of the light guide 102. The length and width of the micro-optical element 124 is measured in a plane parallel to the major surface 106, 108 of the light guide 102 for planar light guides or along a surface contour for non-planar light guides 102.

The micro-optical elements 124 can be any suitable shape. As an example, the light guide 102 shown in FIG. 1 includes micro-optical elements 124 at the major surface 106 configured as v-groove-shaped depressions having an arcuate ridge, hereinafter referred to as "football-shaped" micro-optical elements. A football-shaped micro-optical element resembles the profile of the ball used in American football. Each football-shaped micro-optical element 124 includes a first side surface 126 and a second side surface 128 that come together to form a ridge 130 having ends that intersect the one of the major surfaces 106, 108 at which the micro-optical element 124 is formed. The included angle formed between the first side surface 126 and the second side surface 128 may be any suitable angle. The included angles of the respective micro-optical elements 124 may be set for extracting light from the light guide 102 at a defined intensity profile and/or light ray angle distribution. As an example, the included angles of the respective football-shaped micro-optical elements 124 may range from 40 degrees to 165 degrees. In some embodiments, at least one of the first side surface 126 and the second side surface 128 is curved. In other embodiments, at least one of the first side surface 126 and the second side surface 128 is planar. In some embodiments, the first side surface 126 and the second side surface 128 are symmetric relative to a plane extending parallel to and intersecting the ridge 130, and extending normal to the major surface. In other embodiments, the first side surface 126 and the second side surface 138 are asymmetric relative to a plane extending parallel to and intersecting the ridge 130, and extending normal to the major surface.

Other exemplary embodiments of the light guide 102 may include micro-optical elements 124 having other suitable shapes. In an example, one or more of the micro-optical elements may be configured as a dragged truncated cone (not shown) having a pair of opposed oppositely sloping planar sides and opposed oppositely rounded or curved ends, and a planar top intersecting the oppositely sloping sides and oppositely rounded ends. Other exemplary micro-optical elements 124 are described in U.S. Pat. No. 6,752,505, the entire content of which is incorporated by reference, and, for the sake of brevity, are not described in detail in this disclosure.

At least a portion of the micro-optical elements 124 each include a longitudinal axis. The longitudinal axis extends in a plane parallel to the major surface 106, 108 of the light guide 102 for planar light guides or along a surface contour for non-planar light guides 102. With reference to FIG. 1, each football-shaped micro-optical element includes a longitudinal axis 132 extending parallel to the ridge 130. In other embodiments where the micro-optical element is a shape other than the football shape, the longitudinal axis may be defined by one of the length or width of the micro-optical element in a plane parallel to the major surface 106, 108 of the light guide 102 for planar light guides or along a surface contour for non-planar light guides 102. As an example, for a dragged truncated cone (not shown), the longitudinal axis may extend along its length and intersect its oppositely rounded ends.

In some embodiments, the longitudinal axis extends along the longer of the length or width of the micro-optical element. In other embodiments, the longitudinal axis extends along the shorter of the length or width of the micro-optical element. In some embodiments where the length and the width of the micro-optical element are the same (e.g., a micro-optical element having a square base), the longitudinal axis may extend along one of the length or the width of the micro-optical element. The longitudinal axis may be arranged closer to parallel to the light input edge than an axis extending perpendicular to the longitudinal axis and along the other of the length or width of the micro-optical element.

The longitudinal axis is distinguishable from other axes of the micro-optical element extending in a plane parallel to the major surface 106, 108 of the light guide 102 for planar light guides or along a surface contour for non-planar light guides 102. Accordingly, some micro-optical elements (e.g., a conical or frustoconical micro-optical element having a circular base) may not have a distinguishable longitudinal axis.

In some embodiments, the micro-optical elements have the same or nominally the same shape, size, depth, height, slope angle, included angle, and/or index of refraction. The term "nominally" encompasses variations of one or more parameters that fall within acceptable tolerances in design and/or manufacture. As an example, each of the micro-optical elements 124 may have the same or nominally the same football shape shown in FIG. 1. In other embodiments, the micro-optical elements may vary in one or more of shape, size, depth, height, slope angle, included angle, and/or index of refraction. As an example, the light guide 102 may include first micro-optical elements each having a football shape with an included angle of 70 degrees, and second micro-optical elements each having a football shape with an included angle of 120 degrees. This variation in micro-optical elements may achieve a desired light output from the light guide over the corresponding major surface(s). Accordingly, the reference numeral 124 will be generally used to collectively refer to the different embodiments of micro-optical elements.

Each micro-optical element 124 includes at least one surface configured to refract or reflect light propagating in the light guide 102 and incident thereon such that the light is extracted from the light guide. Such surface(s) is also herein referred to as a light-redirecting surface. With exemplary reference to the football-shaped micro-optical element 124 shown in FIG. 1, at least one of the first side surface 126 and the second side surface 128 is a light-redirecting surface.

In some embodiments, the micro-optical elements 124 (e.g., the first side surface 126 and the second side surface 128) have a low surface roughness. In this disclosure, the term "low surface roughness" refers to a defined surface roughness suitable for specularly reflecting or refracting incident light. In one embodiment, the low surface roughness is an average surface roughness ($R_{a-low}$) less than about 10.0 nm as measured in an area of 0.005 mm². In another embodiment, the low surface roughness is an average surface roughness ($R_{a-low}$) less than about 5.0 nm as measured in an area of 0.005 mm². In another embodiment, the low surface roughness is an average surface roughness ($R_{a-low}$) less than about 1.0 nm as measured in an area of 0.005 mm². A micro-optical element with all of its surfaces having a low surface roughness will also be referred to as a low surface roughness micro-optical element. As an example, in some embodiments, the low surface roughness micro-optical elements may have an average surface roughness ($R_{a-low}$) ranging from about 0.5 nm to about 5.0 nm as measured in an area of 0.005 mm².

Figure 2:
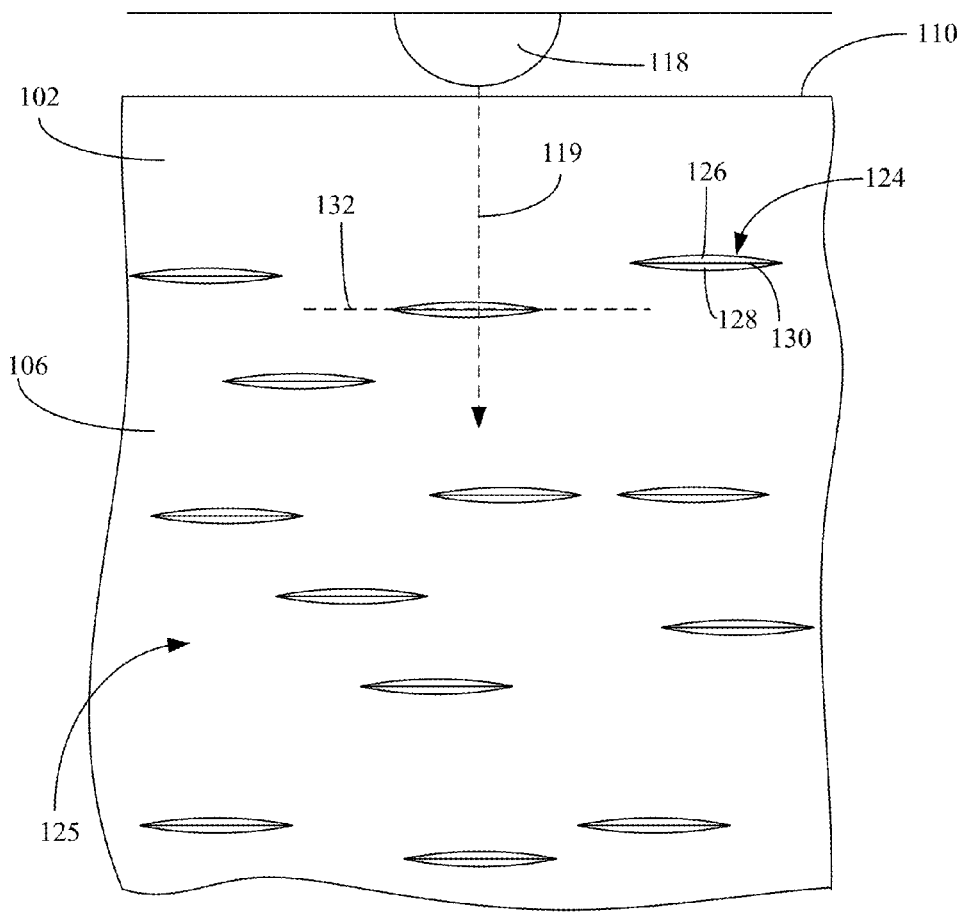
FIG. 2 is a schematic view of part of an exemplary embodiment of the lighting assembly of FIG. 1.

The micro-optical elements 124 may be arranged at the light guide 102 to specularly extract light from the light guide 102 in a defined intensity profile and with a defined light ray angle distribution. Accordingly, the micro-optical elements 124 may be arranged in an array corresponding to the light input edge 110. With additional reference to FIG. 2, each of the micro-optical elements 124 are typically arranged in an array 125 of linearly oriented micro-optical elements in order to achieve this desired light extraction. The term "array of linearly oriented micro-optical elements" is defined as an array of micro-optical elements, each micro-optical element having the same angular orientation relative to one another. As exemplified in FIG. 2, the array 125 of linearly oriented micro-optical elements includes an array of football-shaped micro-optical elements, each football-shaped micro-optical element arranged with its longitudinal axis 132 oriented in the same direction. That is, the longitudinal axes of the micro-optical elements 124 are parallel or nominally parallel to one another. In embodiments where the light input edge is a straight surface (e.g., as shown in FIGS. 1 and 2), the longitudinal axes of each of the micro-optical elements 124 may also be parallel to the light input edge. In embodiments where the light input edge is a curved surface, the longitudinal axes of each of the micro-optical elements 124 may also be parallel to the tangent of at least a portion of the light input edge.

Figure 3:
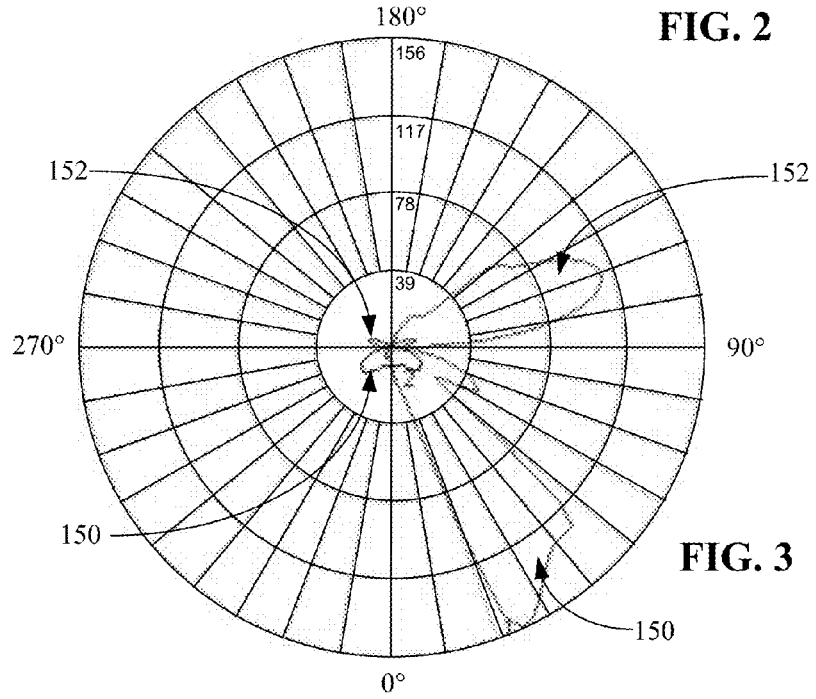
FIG. 3 is an output distribution profile of an exemplary lighting assembly.

FIG. 3 is an output distribution profile showing far-field light ray angle distributions of light extracted from exemplary embodiment of the light guide 102 shown in FIGS. 1 and 2 in which the micro-optical elements 124 are arranged in an array of linearly oriented micro-optical elements. Each of the micro-optical elements 124 are configured as football shaped micro-optical elements having an included angle of 120°. The degree scale shown in FIG. 3 represents an azimuth relative to the normal of the major surface 106, 108. The output distribution profile shows the light distribution (vertical beam angle) in a first plane 1 orthogonal to the light input edge 110 and to the major surfaces 106, 108 of the light guide 102. For this distribution, the light source 104 is arranged adjacent the light input edge 110 proximate 270°, the major surface 106 is arranged proximate 180°, and the major surface 108 is arranged proximate 0°. The output distribution profile also shows the light distribution (horizontal beam angle) in a second plane 2 orthogonal to the side edges 114, 116 and to the major surfaces 106, 108 of the light guide 102. For this distribution, the major surface 106 is arranged proximate 180°, the major surface 108 is arranged proximate 0°, and the light source 104 is arranged normal to the plane of the page.

As shown in FIG. 3, for the first plane 1 (showing vertical beam angle), the micro-optical elements 124 arranged in the array of linearly oriented micro-optical elements specularly reflect a first portion 150 of the light input to the light guide 102 from the light source 104 through the major surface 108 of the light guide 102 with a vertical beam angle of about 30.0°. The first micro-optical elements 124 also specularly refract a second portion 152 of the light input to the light guide 102 from the light source 104 through the major surface 106 of the light guide 102 with a vertical beam angle of about 32.5°. For the second plane 2 (showing horizontal beam angle), the micro-optical elements 124 arranged in the array of linearly oriented micro-optical elements specularly reflect the first portion 150 of the light through the major surface 108 of the light guide 102 with a horizontal beam angle of about 100.0°. The first micro-optical elements 124 also specularly refract the second portion 152 of the light through the major surface 106 of the light guide 102 with a horizontal beam angle of about 60.0°.

While the array 125 of linearly oriented micro-optical elements may provide specular light extraction from the light guide 102 in a defined intensity profile and with a defined light ray angle distribution, this linear array also provides an optically-specular path extending into the light guide 102 from the light input edge 110. As a result, the surfaces of the light guide 102 including the array 125 of linearly oriented micro-optical elements create an imaging path back to the light source 104, and reflections of the light source 104 as viewed through the optically-specular path are visible to a viewer viewing the lighting assembly 100. The light source 104 includes discrete solid-state light emitters 118 that create visual artifacts due to imaging of the light source 104. Accordingly, even if the micro-optical elements 124 are arranged to extract light in a uniform intensity profile over the major surface 106, 108, the optically-specular path creates the visual effect of one or more relatively high-intensity columns of light extending along the light guide 102 from the light input edge 110. This visual effect is also referred to herein as a "headlighting" effect.

While the headlighting effect can be reduced by one or more optical adjusters (not shown) (e.g., a diffusing film) located adjacent one or both of the major surfaces 106, 108, the use of the optical adjusters for such purpose destroys the directional, specular light output distribution of the light output from the lighting assembly 100. The use of the optical adjusters also lowers the efficiency of the lighting assembly 100. Furthermore, in many applications (e.g., as a lighting fixture, a sign, a display apparatus, etc.), the use of an optical adjuster is not preferable (e.g., for aesthetic reasons).

Figure 4:
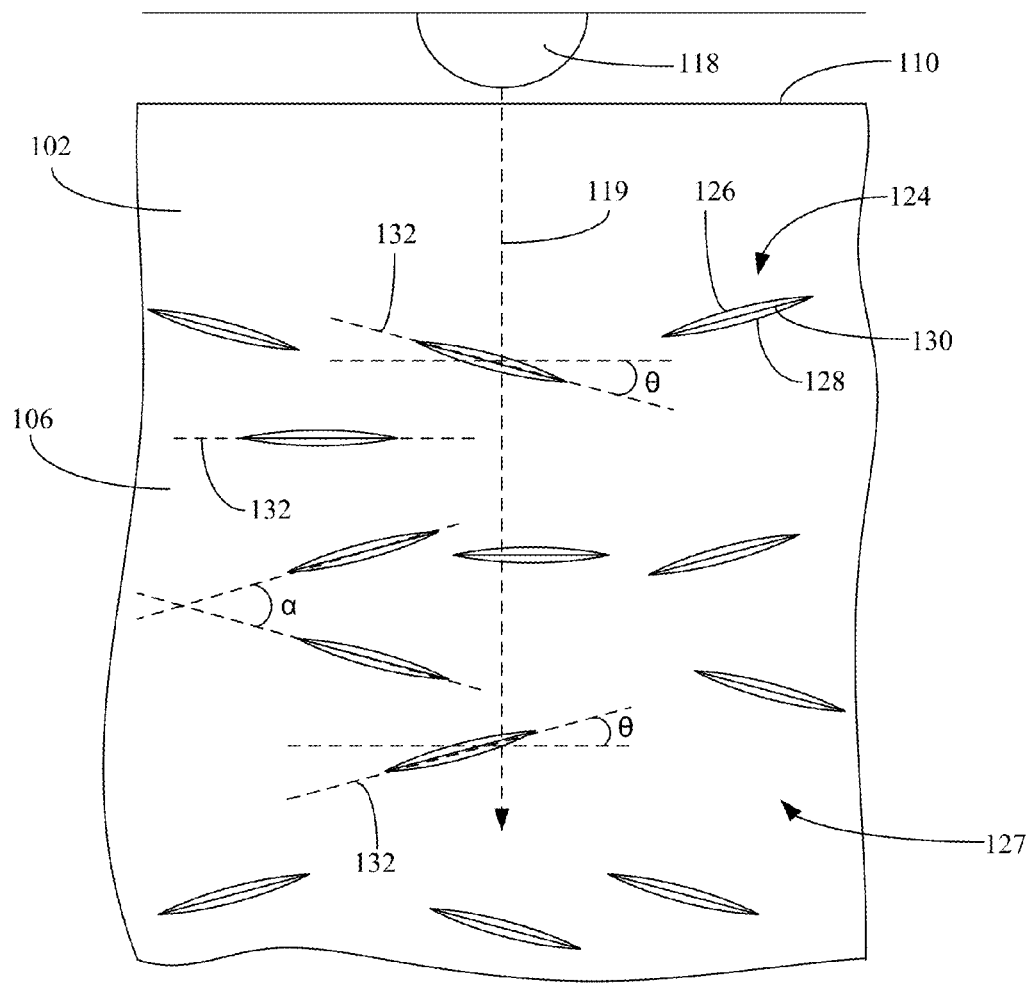
FIG. 4 is a schematic view of part of an exemplary embodiment of the lighting assembly of FIG. 1.
Figure 13:
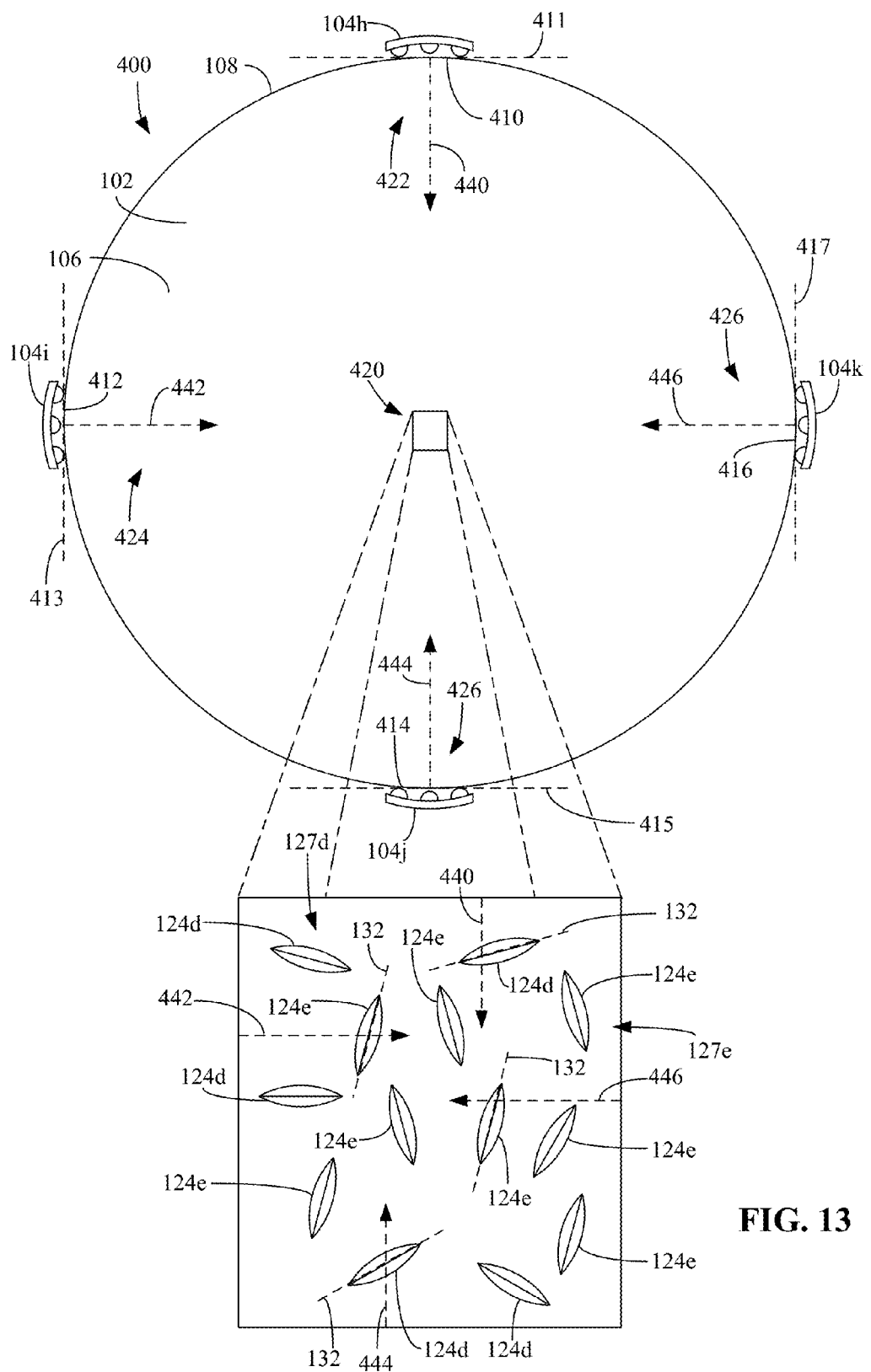

In accordance with the present disclosure, and with exemplary reference to FIGS. 1 and 4, micro-optical elements 124 are included in an array 127 of rotated micro-optical elements corresponding to the light input edge 110. The term "array of rotated micro-optical elements" is defined as an array of micro-optical elements, each micro-optical element having a respective rotational orientation differing from among the rotational orientations of other micro-optical elements in the array but by no more than α°. In embodiments where the light input edge is a straight surface (e.g., as shown in FIGS. 1 and 4), the longitudinal axes of the micro-optical elements 124 is also arranged with its longitudinal axis 132 within the range of ±θ° relative to the light input edge, with the angle of θ° being half of α°. In embodiments where the light input edge is a curved surface (e.g., as shown in FIG. 13), the longitudinal axes of the micro-optical elements 124 may be arranged with its longitudinal axis 132 within the range of ±θ° relative to the tangent of at least a portion of the light input edge, with the angle of θ° being half of α°. The angle θ is a positive or negative value to reference the direction of rotation of the micro-optical element. With reference to FIG. 4, rotation in a counter-clockwise direction may provide a positive value, and rotation in a clockwise direction may provide a negative value. In some embodiments, this correlation of rotation direction to positive/negative angle may be reversed (e.g., counter-clockwise is considered negative and clockwise is considered positive).

In one example, each of the micro-optical elements 124 in the array 127 of rotated micro-optical elements includes a longitudinal axis 132 arranged within the range of +45° to −45° (±θ°) relative to the light input edge; and the respective rotational orientations from among the rotational orientations of other micro-optical elements in the array 127 differ by no more than 90°. In another example, each of the micro-optical elements 124 in the array 127 of rotated micro-optical elements includes a longitudinal axis 132 arranged within the range of +30° to −30° (±θ°) relative to the light input edge; and the respective rotational orientations from among the rotational orientations of other micro-optical elements in the array 127 differ by no more than 60°. In another example, each of the micro-optical elements 124 in the array 127 of rotated micro-optical elements includes a longitudinal axis 132 arranged within the range of +15° to −15° (±θ°) relative to the light input edge; and the respective rotational orientations from among the rotational orientations of other micro-optical elements in the array 127 differ by no more than 30°. In another example, each of the micro-optical elements 124 in the array 127 of rotated micro-optical elements includes a longitudinal axis 132 arranged within the range of +10° to −10° (±θ°) relative to the light input edge; and the respective rotational orientations from among the rotational orientations of other micro-optical elements in the array 127 differ by no more than 20°.

Figure 5:
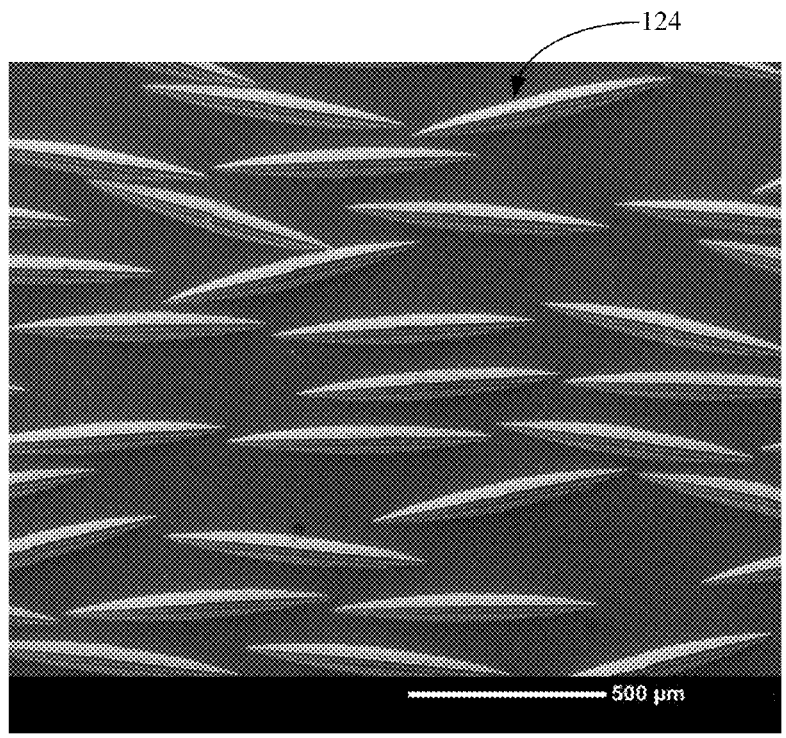
FIGS. 5 and 6 are scanning electron microscope ("SEM") images of exemplary micro-optical elements.
Figure 6:
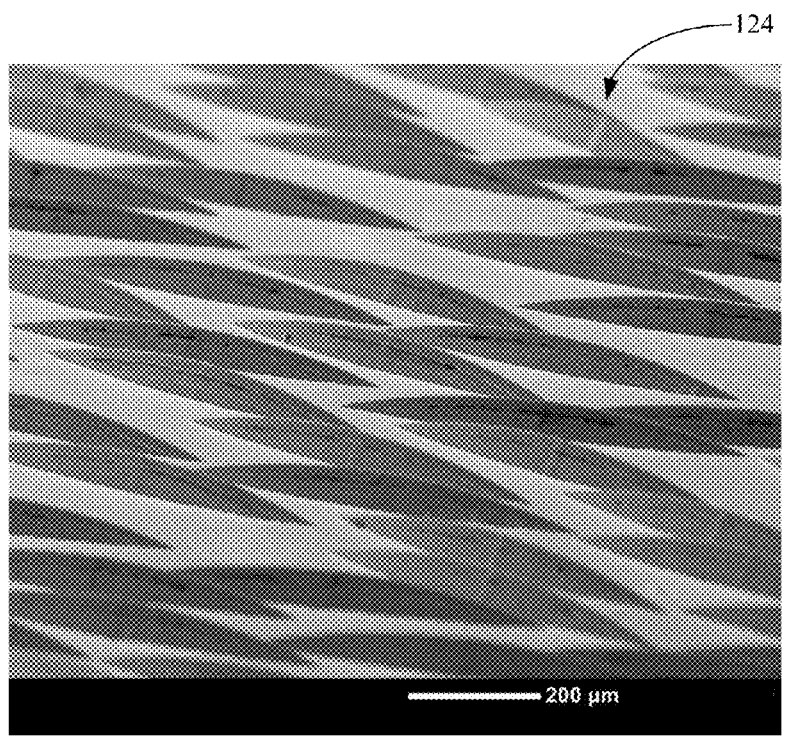

FIGS. 5 and 6 are SEM images specifically showing exemplary micro-optical elements 124 configured as football-shaped micro-optical elements. As shown, the micro-optical elements 124 included light guide 102 are provided in an array of rotated micro-optical elements. In some embodiments, the micro-optical elements 124 in the array 127 of rotated micro-optical elements are the only micro-optical elements present at the light guide.

At least a portion of the micro-optical elements 124 in the array 127 have a longitudinal axis 132 that is non-parallel to the light input edge 110. Accordingly, for a path linearly extending from the light input edge 110 along the light guide 102, at least one of the micro-optical elements along the path is arranged with the longitudinal axis 132 thereof at a positive angle relative to the light input edge 110 (or relative to the tangent of at least a part of the light input edge, for a curved light input edge), and at least another one of the micro-optical elements 124 along the path is arranged with the longitudinal axis 132 thereof at a negative angle relative to the light input edge (or relative to the tangent of at least a part of the light input edge, for a curved light input edge). FIG. 4 shows an exemplary path extending along the light guide 102 orthogonal to the light input edge 110 as the optical axis of a solid-state light emitter. Other paths that are non-orthogonal to the light input edge (e.g., non-parallel or "off-axis" to the optical axis 119 of a solid-state light emitter) may also intersect at least one of the micro-optical elements 124 arranged with the longitudinal axis 132 thereof at a positive angle relative to the light input edge, and at least another one of the micro-optical elements 124 arranged with the longitudinal axis 132 thereof at a negative angle relative to the light input edge.

The respective rotational orientations of the micro-optical elements 124 in the array 127 of rotated micro-optical elements may be provided at random or in a predefined manner. In some embodiments, a portion of the micro-optical elements 124 in the array 127 of rotated micro-optical elements are respectively arranged with the longitudinal axes 132 thereof parallel or nominally parallel to the light input edge 110 (or the tangent of at least a portion of the light input edge), and a portion of the micro-optical elements 124 in the array 127 of rotated micro-optical elements are respectively arranged with the longitudinal axes 132 thereof non-parallel to the light input edge 110 (or the tangent of at least a portion of the light input edge). In some embodiments, the respective rotational orientations of the longitudinal axes 132 of the micro-optical elements 124 in the array 127 may be uniformly distributed at the light guide 102. In an example, the percentage of micro-optical elements having a given rotational orientation from among the micro-optical elements at a given location at the light guide 102 may be the same or nominally the same as this percentage at any other location at the light guide 102. In another example, the percentage of micro-optical elements having a given rotational orientation from among the micro-optical elements at a given location at the light guide 102 may be the same or nominally the same as the percentage of micro-optical elements having a different rotational orientation from among the micro-optical elements at the given location. In other embodiments, as described below, respective rotational orientations of the micro-optical elements 124 in the array 127 of rotated micro-optical elements may vary depending on their location at the light guide 102.

The micro-optical elements 124 provided in the array 127 of rotated micro-optical elements are configured to reduce or eliminate the headlighting effect by disrupting the optically-specular path extending from the light input edge 110. The rotated micro-optical elements 124 create images in varied directions based on their rotation, thereby breaking up an overall continuous image of the light input edge 110. This provides the visual effect of a nominally uniform light output proximate the light input edge 110 to a viewer viewing the lighting assembly 100.

Figure 7:
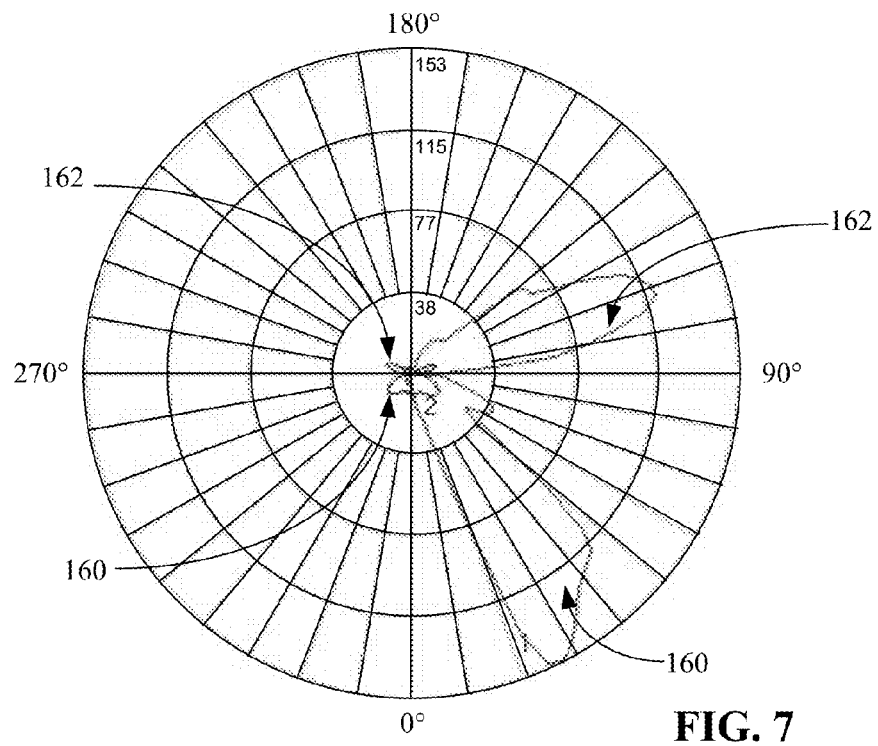
FIGS. 7-10 are output distribution profiles of exemplary lighting assemblies.
Figure 8:
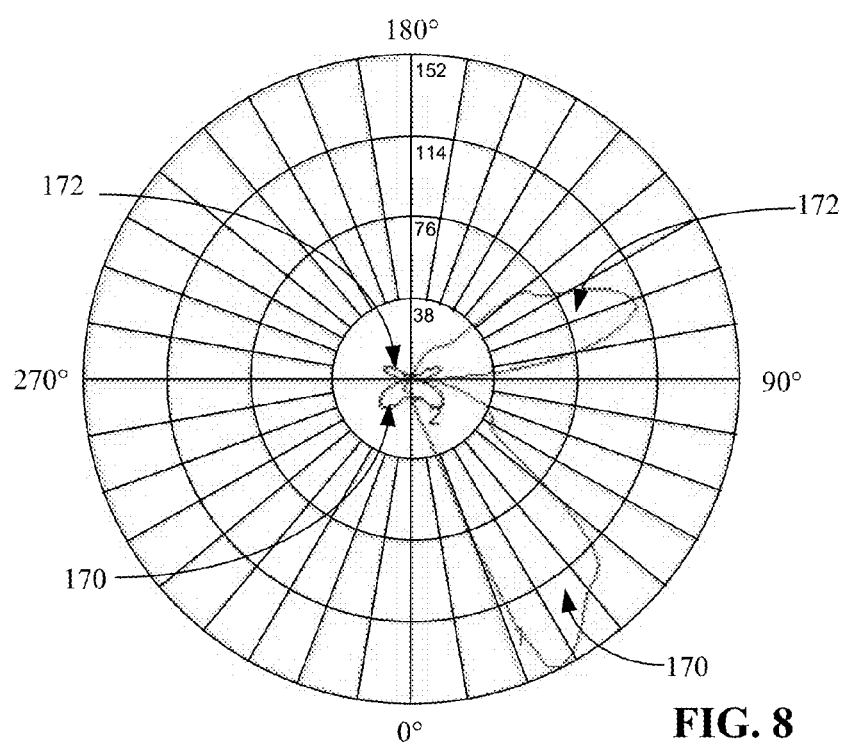

In addition to reducing headlighting, the array 127 of rotated micro-optical elements also provides similar ray angle control of the light extracted from the light guide 102. FIGS. 7 and 8 are respective output distribution profiles showing far-field light ray angle distributions of light extracted from exemplary embodiments of the light guide 102 shown in FIGS. 1 and 4. In the exemplary embodiment of the light guide associated with FIG. 7, each of the micro-optical elements 124 are configured as football shaped micro-optical elements having an included angle of 120° and having a longitudinal axis 132 arranged within the range of +15° to −15° relative to the light input edge 110. In the exemplary embodiment of the light guide associated with FIG. 8, each of the micro-optical elements 124 are configured as football shaped micro-optical elements having an included angle of 120° and having a longitudinal axis 132 arranged within the range of +30° to −30° relative to the light input edge 110. Accordingly, the micro-optical elements provided in the exemplary light guides associated with FIGS. 7 and 8 differ from the micro-optical elements provided in the exemplary light guide associated with FIG. 2 in the rotation of the micro-optical elements.

The output distribution profiles of each of FIGS. 7 and 8 show the light distributions (vertical beam angle and horizontal beam angle) in respective first and second planes 1, 2 similar to those described above with respect to FIG. 3.

As shown in FIG. 7 (range of +15° to −15° relative to the light input edge 110), for the first plane 1 (showing vertical beam angle), the micro-optical elements 124 specularly reflect a first portion 160 of the light input to the light guide 102 from the light source 104 through the major surface 108 of the light guide 102 with a vertical beam angle of about 30.0°. The micro-optical elements 124 also specularly refract a second portion 162 of the light input to the light guide 102 from the light source 104 through the major surface 106 of the light guide 102 with a vertical beam angle of about 32.5°. For the second plane 2 (showing horizontal beam angle), the micro-optical elements 124 specularly reflect the first portion 160 of the light through the major surface 108 of the light guide 102 with a horizontal beam angle of about 110.0°. The first micro-optical elements 124 also specularly refract the second portion 162 of the light through the major surface 106 of the light guide 102 with a horizontal beam angle of about 60.0°.

As shown in FIG. 8 (range of +30° to −30° relative to the light input edge 110), for the first plane 1 (showing vertical beam angle), the micro-optical elements 124 specularly reflect a first portion 170 of the light input to the light guide 102 from the light source 104 through the major surface 108 of the light guide 102 with a vertical beam angle of about 30.0°. The micro-optical elements 124 also specularly refract a second portion 172 of the light input to the light guide 102 from the light source 104 through the major surface 106 of the light guide 102 with a vertical beam angle of about 35.0°. For the second plane 2 (showing horizontal beam angle), the micro-optical elements 124 specularly reflect the first portion 170 of the light through the major surface 108 of the light guide 102 with a horizontal beam angle of about 110.0°. The first micro-optical elements 124 also specularly refract the second portion 172 of the light through the major surface 106 of the light guide 102 with a horizontal beam angle of about 60.0°.

As shown from FIGS. 7 and 8, the specular light ray angle distributions of light extracted from the light guide 102 are largely maintained in the embodiments including the array 127 of rotated micro-optical elements, as compared with the light ray angle distribution of light extracted from the light guide 102 having the array 125 of linearly oriented micro-optical elements. Specifically, the vertical beam angle associated with the light guide including the array 127 of rotated micro-optical elements are largely the same as the vertical beam angle associated with the light guide including the array 125 of linearly oriented micro-optical elements. However, as the maximum rotation changes from ±15° (FIG. 7) to ±30° (FIG. 8), the profile of the light does slightly deviate from the profile of the array 125 of linearly oriented micro-optical elements (FIG. 3.) It is also noted that the horizontal beam angle does slightly widen to 110° in the examples associated with the light guide including the array 127 of rotated micro-optical elements as compared with the horizontal beam angle of 100° associated with the light guide including the array 125 of linearly oriented micro-optical elements.

In some embodiments, the array 127 of rotated micro-optical elements may be configured so that the widening of the horizontal beam angle is intentionally imparted to the light extracted from the light guide. This may achieve a more uniform output distribution in the off-axis (e.g., an axis parallel to the light input edge and perpendicular to the optical axis of the solid-state light emitter(s)). This intentional widening of the horizontal beam angle may be advantageous in embodiments where light is input to the light guide at only one or less than all of the edge surfaces.

The broader light ray angle distribution of the light extracted by the array 127 of rotated micro-optical elements does slightly reduce the directional output of the light extracted from the light guide 102 as a whole. Accordingly, the micro-optical elements of the array 127 of rotated micro-optical elements may be arranged to minimize this reduction. Typically the headlighting effect manifests more strongly in close proximity to the light input edge 110. Thus, the rotated micro-optical elements may be arranged in a particular manner to add to effective reduction of the headlighting effect while maintaining an overall directional light output of the lighting assembly 100.

In some embodiments, the percentage of rotated micro-optical elements from among the micro-optical elements present at a given location of the light guide decreases with increasing distance from the light input edge. For example, with reference to FIG. 1, the percentage of rotated micro-optical elements from among the micro-optical elements present at a given location of the light guide may decrease with increasing distance from the light input edge along the light guide from the light input edge 110 to the opposing edge surface 112. FIG. 1 shows three exemplary locations 134, 136, 138 of the light guide 102. At a location 134 proximate the light input edge 110, the percentage of micro-optical elements having a longitudinal axis 132 arranged at an angle relative to the light input edge 110 from among the micro-optical elements at the location 134 is highest, and the percentage of micro-optical elements having a longitudinal axis 132 parallel to the light input edge 110 is lowest. In an example, the percentage of micro-optical elements having a longitudinal axis 132 arranged at an angle relative to the light input edge 110 at the location 134 is about 75% to about 100%, and the percentage of micro-optical elements having a longitudinal axis 132 parallel to the light input edge 110 is about 0% to about 25%.

At a location 136 further from the light input edge 110, the percentage of micro-optical elements having a longitudinal axis 132 arranged at an angle relative to the light input edge 110 from among the micro-optical elements at the location 136 is lower than the percentage at location 134, and the percentage of micro-optical elements having a longitudinal axis 132 parallel to the light input edge 110 is higher than the percentage at location 134. In an example, the percentage of micro-optical elements having a longitudinal axis 132 arranged at an angle relative to the light input edge at the location 136 is about 25% to about 75%, and the percentage of micro-optical elements having a longitudinal axis 132 parallel to the light input edge 110 is about 25% to about 75%. At a location 138 still further from the light input edge 110, the percentage of micro-optical elements having a longitudinal axis 132 arranged at an angle relative to the light input edge 110 from among the micro-optical elements at the location 138 is lower than the percentage at locations 134 and 136, and the percentage of micro-optical elements having a longitudinal axis 132 parallel to the light input edge 110 is higher than the percentage at locations 134 and 136. In an example, the percentage of micro-optical elements having a longitudinal axis 132 arranged at an angle relative to the light input edge at the location 138 is about 0% to about 25%, and the percentage of micro-optical elements having a longitudinal axis 132 parallel to the light input edge is about 75% to about 100%.

In some embodiments, the maximum angle θ of the micro-optical elements having a longitudinal axis 132 arranged at an angle relative to the light input edge 110 at a given location of the light guide 102 decreases with increasing distance from the light input edge 110 along the light guide from the light input edge to the opposing edge surface. Accordingly, the angle α may also reduce as a function of distance from the light input edge. With continued reference to FIGS. 1 and 4, at a location 134 proximate the light input edge 110, the maximum angle θ of the micro-optical elements 124 having a longitudinal axis 132 arranged at an angle relative to the light input edge 110 is highest. In an example, the maximum angle θ of the micro-optical elements 124 having a longitudinal axis 132 arranged at an angle relative to the light input edge is ±30°. At a location 136 further from the light input edge 110, the maximum angle θ of the micro-optical elements having a longitudinal axis 132 arranged at an angle relative to the light input edge 110 is lower than the maximum angle θ at location 134. In an example, the maximum angle θ of the micro-optical elements 124 having a longitudinal axis 132 arranged at an angle relative to the light input edge is ±15°. At a location 138 further from the light input edge 110, the maximum angle θ of the micro-optical elements 124 having a longitudinal axis 132 arranged at an angle relative to the light input edge 110 is lower than the maximum angle θ at locations 134 and 136. In an example, the maximum angle θ of the micro-optical elements 124 having a longitudinal axis 132 arranged at an angle relative to the light input edge is ±10°.

In some embodiments, at least a portion of the micro-optical elements 124 in the array 127 of rotated micro-optical elements include at least one surface having a high surface roughness. In this disclosure, the term "high surface roughness" refers to a defined surface roughness suitable for imparting a diffuse component to incident light that is reflected or refracted. The high surface roughness is greater than the low surface roughness described above. The high surface roughness is a defined roughness intentionally imparted to the at least one surface of the micro-optical element. In one embodiment, the high surface roughness is an average surface roughness ($R_{a\text{-}high}$) equal or greater than about 0.10 μm as measured in an area of 0.005 mm². In another embodiment, the high surface roughness is an average surface roughness ($R_{a\text{-}high}$) ranging from about 0.10 μm to about 5.0 μm as measured in an area of 0.005 mm². In another embodiment, the high surface roughness is an average surface roughness ($R_{a\text{-}high}$) ranging from about 0.30 μm to about 3.0 μm as measured in an area of 0.005 mm². In another embodiment, the high surface roughness is an average surface roughness ($R_{a\text{-}high}$) ranging from about 0.30 μm to about 1.0 μm as measured in an area of 0.005 mm².

In this disclosure, the term "surface roughness" of a micro-optical element refers to the surface roughness of the roughest surface of the micro-optical element. For example a micro-optical element 124 is referred to as having a high surface roughness (e.g., a high surface roughness micro-optical element) in embodiments where at least one surface of the micro-optical element has a high surface roughness (e.g., even if other surfaces of the micro-optical element have a low surface roughness).

The micro-optical elements 124 having the high surface roughness are additionally configured to reduce or eliminate the headlighting effect by disrupting the optically-specular path extending from the light input edge 110. The high surface roughness of the micro-optical element 124 alters the optical characteristics of the side surface 126, 128 such that the side surface reflects and refracts light partially specularly and partially diffusely.

Figure 9:
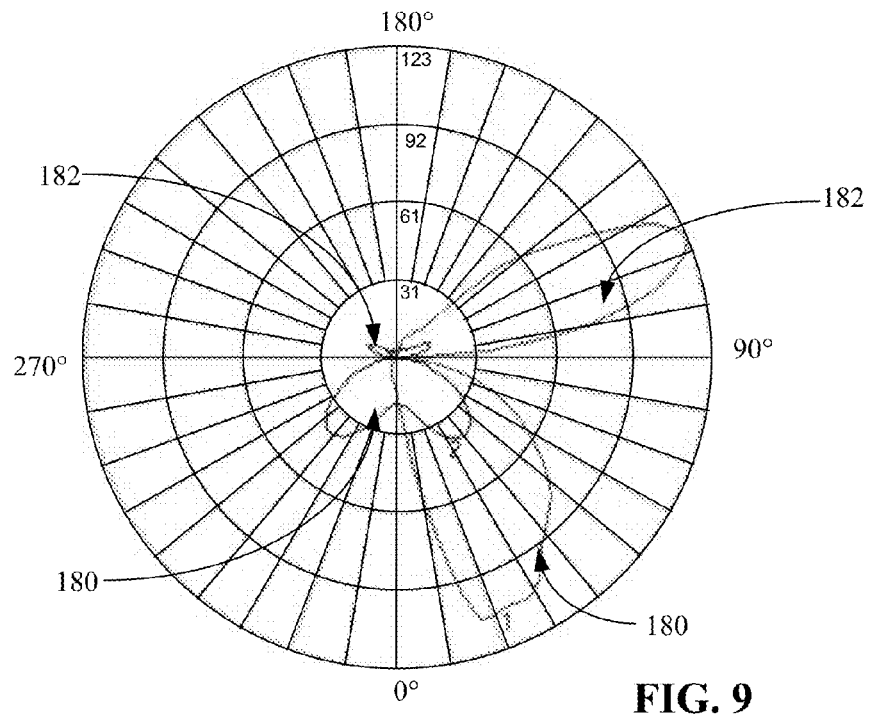

FIG. 9 is an output distribution profile showing far-field light ray angle distributions of light extracted from an exemplary embodiment of the light guide 102 shown in FIGS. 1 and 4. In the exemplary embodiment of the light guide 102 associated with FIG. 9, each of the micro-optical elements 124 are configured as football shaped micro-optical elements having an included angle of 115° and having a longitudinal axis arranged within the range of +15° to −15° relative to the light input edge. Each of the micro-optical elements 124 is also embodied as a high surface roughness micro-optical element having arcuate grooves formed on the surfaces thereof. Accordingly, the micro-optical elements provided in the exemplary light guide associated with FIG. 9 differ from the micro-optical elements provided in the exemplary light guide associated with FIG. 7 in the surface roughness of the micro-optical elements.

The output distribution profiles of FIG. 9 shows the light distributions (vertical beam angle and horizontal beam angle) in respective first and second planes 1,2 similar to those described above with respect to FIG. 3

As shown in FIG. 9, for the first plane 1 (showing vertical beam angle), the micro-optical elements 124 specularly reflect a first portion of the light input to the light guide 102 from the light source 104 through the major surface 108 of the light guide 102 with a vertical beam angle of about 55.0°. The micro-optical elements 124 also specularly refract a second portion 141 of the light input to the light guide 102 from the light source 104 through the major surface 106 of the light guide 102 with a vertical beam angle of about 47.5°. For the second plane 2 (showing horizontal beam angle), the micro-optical elements 124 specularly reflect the first portion of the light through the major surface 108 of the light guide 102 with a horizontal beam angle of about 140.0°. The first micro-optical elements 124 also specularly refract the second portion 141 of the light through the major surface 106 of the light guide 102 with a horizontal beam angle of about 70.0°.

By comparing FIGS. 7 and 9, it is apparent that the high surface roughness of the micro-optical elements 124 imparts a diffuse (e.g., lambertian) component to the light extracted from the light guide 102. In other words, the high surface roughness of the second micro-optical elements 124 provides a defined broadening of the peak of the light ray angle distribution of the light extracted from the light guide 102.

Because the array 127 of rotated micro-optical elements already provides at least some reduction of the headlighting, in some embodiments, the array 127 of rotated micro-optical elements may include a portion of micro-optical elements 124 having a low surface roughness, and another portion of the micro-optical elements 124 having a high surface roughness. This embodiment of mixed low surface roughness and high surface roughness micro-optical elements may provide a reduction of headlighting, while also improving the control over the light ray angle distribution as compared with an embodiment where each of the micro-optical elements in the array are high surface roughness micro-optical elements.

Figure 10:
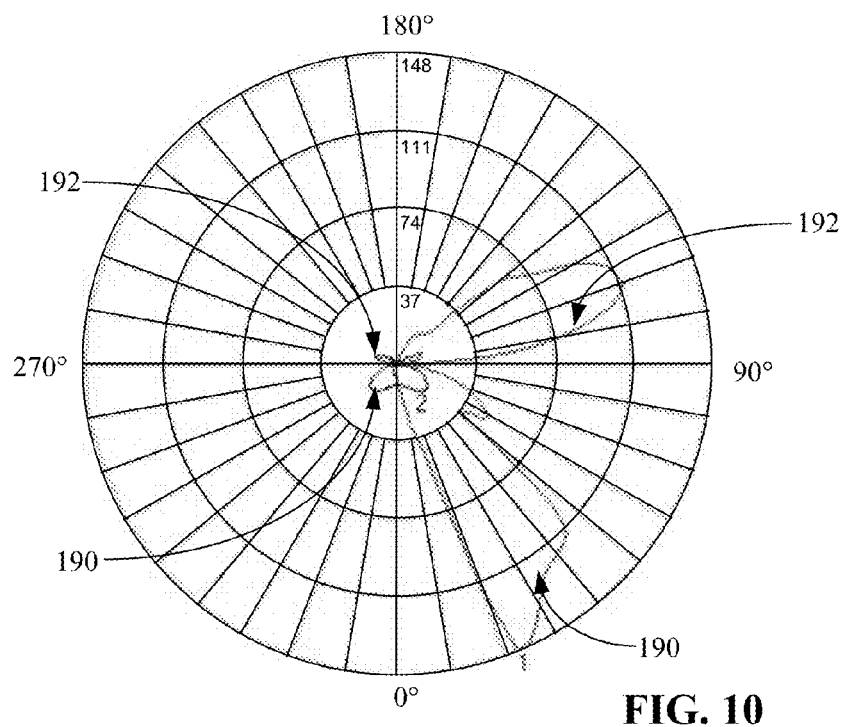

FIG. 10 is an output distribution profile showing far-field light ray angle distributions of light extracted from an exemplary embodiment of the light guide 102 shown in FIGS. 1 and 4. In the exemplary embodiment of the light guide associated with FIG. 10, a portion of the micro-optical elements 124 are configured as football shaped micro-optical elements having an included angle of 115°, having a longitudinal axis 132 arranged within the range of +15° to −15° relative to the light input edge 110, and having a high surface roughness from arcuate grooves. Another portion of the micro-optical elements 124 are configured as football shaped micro-optical elements having an included angle of 120°, having a longitudinal axis 132 arranged within the range of +15° to −15° relative to the light input edge 110, and having a low surface roughness. Accordingly, the micro-optical elements provided at the exemplary light guide associated with FIG. 10 differ from the micro-optical elements provided in the exemplary light guide associated with FIG. 9 in that a portion of the micro-optical elements 124 are low surface roughness micro-optical elements.

The output distribution profiles of FIG. 10 shows the light distributions (vertical beam angle and horizontal beam angle) in respective first and second planes 1, 2 similar to those described above with respect to FIG. 3.

As shown in FIG. 10, for the first plane 1 (showing vertical beam angle), the micro-optical elements 124 specularly reflect a first portion of the light input to the light guide 102 from the light source 104 through the major surface 108 of the light guide 102 with a vertical beam angle of about 30.0°. The micro-optical elements 124 also specularly refract a second portion 141 of the light input to the light guide 102 from the light source 104 through the major surface 106 of the light guide 102 with a vertical beam angle of about 35.0°. For the second plane 2 (showing horizontal beam angle), the micro-optical elements 124 specularly reflect the first portion of the light through the major surface 108 of the light guide 102 with a horizontal beam angle of about 95.0°. The first micro-optical elements 124 also specularly refract the second portion 141 of the light through the major surface 106 of the light guide 102 with a horizontal beam angle of about 70.0°.

By comparing FIGS. 9 and 10, it is apparent that the mixed low surface roughness micro-optical elements and high surface roughness micro-optical elements provide an output distribution profile that is more similar to the output distribution profiles shown in FIGS. 3, 7, and 8.

In some embodiments, the array 127 of rotated micro-optical elements includes a nominally uniform mix of low surface roughness micro-optical elements and high surface roughness micro-optical elements. In an example, the percentage of low surface roughness micro-optical elements from among the micro-optical elements present at any given location of the light guide may be approximately 50%, and the percentage of high surface roughness micro-optical elements from among the micro-optical elements present at any given location of the light guide may be approximately 50%. In another example, the percentage of low surface roughness micro-optical elements from among the micro-optical elements present at any given location of the light guide may be approximately 75%, and the percentage of high surface roughness micro-optical elements from among the micro-optical elements present at any given location of the light guide may be approximately 25%.

In other embodiments, the mix of low surface roughness micro-optical elements and high surface roughness micro-optical elements in the array 127 of rotated micro-optical elements varies as a function of location on the light guide 102. Typically the headlighting effect manifests more strongly in close proximity to the light input edge 110. Thus, the high surface roughness micro-optical elements may be arranged in a particular manner to add to effective reduction of the headlighting effect while maintaining an overall directional light output of the lighting assembly 100.

In some embodiments, the percentage of high surface roughness micro-optical elements from among the micro-optical elements present at a given location of the light guide decreases with increasing distance from the light input edge along the light guide from the light input edge to the opposing edge surface. With reference to FIG. 1, three exemplary locations 134, 136, 138 of the light guide are identified. At a location 134 proximate the light input edge 110, the percentage of high surface roughness micro-optical elements from among the micro-optical elements at the location 134 is highest, and the percentage of low surface roughness micro-optical elements is lowest. In an example, the percentage of high surface roughness micro-optical elements at the location 134 is about 50% to about 75%, and the percentage of low surface roughness micro-optical elements is about 25% to about 50%. At a location 136 further from the light input edge 110, the percentage of high surface roughness micro-optical elements from among the micro-optical elements at the location 136 is lower than the percentage at location 134, and the percentage of low surface roughness micro-optical elements is higher than at location 134. In an example, the percentage of high surface roughness micro-optical elements at the location 136 is about 25% to about 50%, and the percentage of low surface roughness micro-optical elements is about 50% to about 75%. At a location 138 still further from the light input edge 110, the percentage of high surface roughness micro-optical elements from among the micro-optical elements at the location 136 is lower than the percentage at locations 134 and 136, and the percentage of low surface roughness micro-optical elements is higher than at locations 134 and 136. In an example, the percentage of high surface roughness micro-optical elements at the location 138 is about 0% to about 25%, and the percentage of low surface roughness micro-optical elements is about 75% to about 100%.

In some embodiments, the surface roughness of high surface roughness micro-optical elements decreases with increasing distance from the light input edge 110. The variation in surface roughness may be progressive or step wise. Accordingly, the diffuse component imparted to the light extracted from the light guide 102 by a high surface roughness micro-optical elements at a location proximate the light input edge 110 (e.g., location 134) is greater than the diffuse component imparted to the light extracted by a high surface roughness micro-optical element distal the light input edge 110 (e.g., location 136 or 138). In such embodiments where the high surface roughness micro-optical elements 124 mutually differ in surface roughness, this difference in the surface roughness among the high surface roughness micro-optical elements is substantially less than the difference between the average surface roughness ($R_{a\text{-}high}$) of the high surface roughness surface(s) and the average surface roughness ($R_{a\text{-}low}$) of the low surface roughness micro-optical elements.

In the embodiments described above, the light guide 102 includes a single light input edge 110, and the array 127 of rotated micro-optical elements corresponds to the light input edge 110. In some embodiments, the light guide may include more than one light input edge. Although not specifically shown in FIG. 1, one or more of the edge surface 112, 114, 116 may be an additional light input edge, and an additional light source may be positioned adjacent the additional light input edge. Also, in some embodiments, the light guide may include an additional array of rotated micro-optical elements corresponding to the additional light input edge.

With reference to FIGS. 1 and 4, in one example, the edge surface 114 may be an additional light input edge. In the example, the light input edge 110 is considered a first light input edge; the array 127 of rotated micro-optical elements corresponding to the light input edge 110 is considered a first array of rotated micro-optical elements; and the light source 104 is considered a first light source. The edge surface 114 is considered a second light input edge. The light guide may include a second array of rotated micro-optical elements corresponding to the second light input edge 114. The second array of rotated micro-optical elements may at least partially overlap the first array of rotated micro-optical elements.

In another example, the edge surface 112 may be an additional light input edge. In the example, the light input edge 110 is considered a first light input edge, and the light source 104 is considered a first light source. The edge surface 112 is considered a second light input edge. Because the second light input edge 112 is opposite the first light input edge 110, the array of rotated micro-optical elements corresponding to the first light input edge 110 may also correspond to the second light input edge 112. Accordingly, in some embodiments, a single array of rotated micro-optical elements may correspond to more than one (e.g., two) light input edge.

Figure 11:
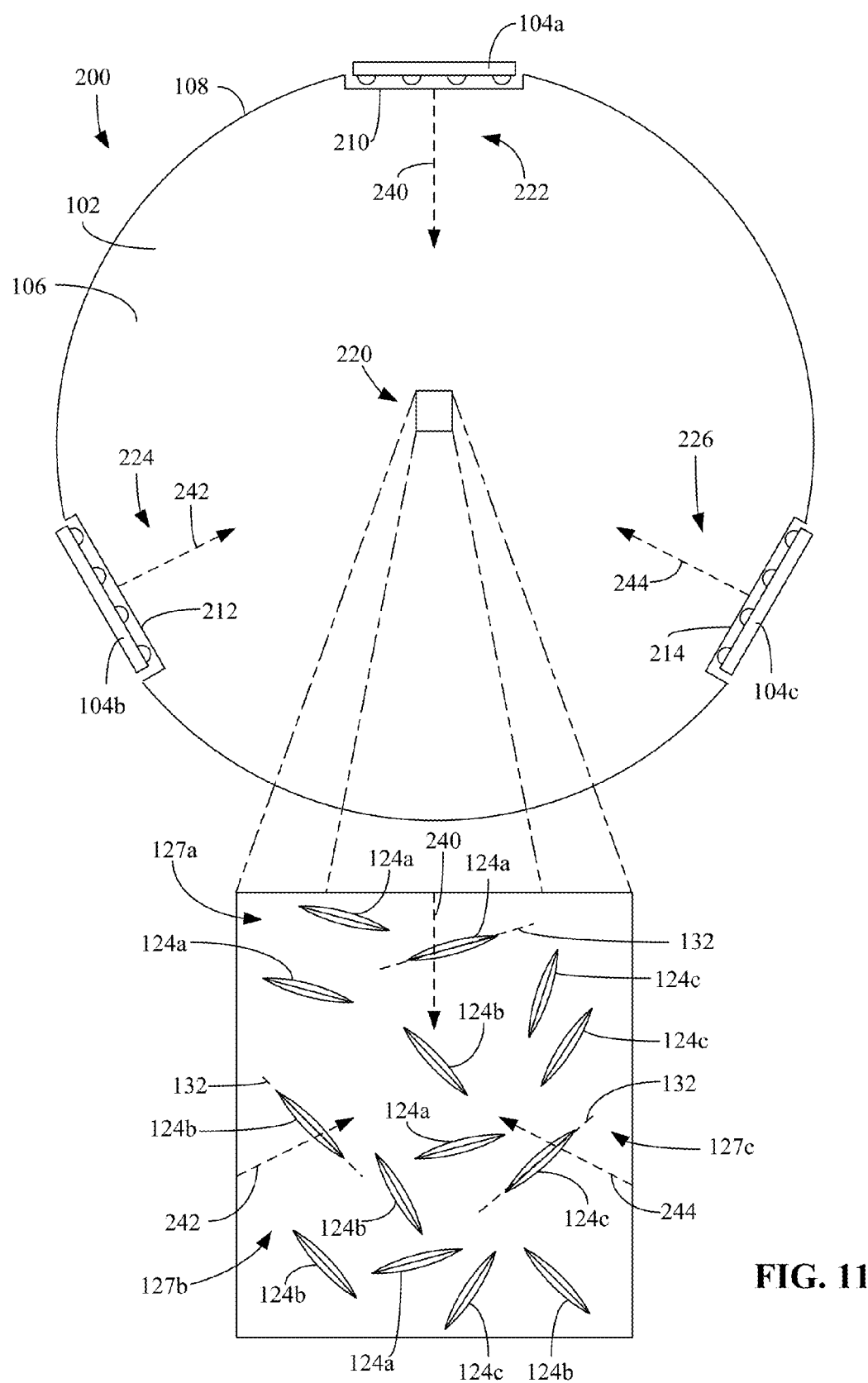
FIGS. 11-14 are schematic views showing exemplary lighting assemblies.

FIG. 11 shows an exemplary lighting assembly 200 including a light guide having more than one light input edge. The light guide of FIG. 11 may include similar features to the light guide described above with respect to FIG. 1. The light guide 102 is circular in shape and includes planar major surfaces 106, 108. The light guide 102 includes edge surfaces extending between the major surfaces 106, 108, the edge surfaces including a first light input edge 210, second light input edge 212, and third light input edge 214. The light input edges are spaced equally apart from one another around the perimeter such that each light input edge is arranged approximately 120° on the perimeter from another one of the light input edges. A light source 104a, 104b, 104c is respectively located adjacent to each light input edge. Each light source 104a, 104b, 104c may include similar features to the light source described above with respect to FIG. 1.

In the illustrated example, the light guide includes three arrays 127a, 127b, 127c of rotated micro-optical elements, each array corresponding to one of the respective light input edges 210, 212, 214. For example, a first array 127a of rotated micro-optical elements includes micro-optical elements arranged with their respective longitudinal axes 132 within the range of ±θ° relative to the first light input edge 210. Micro-optical elements shown in FIG. 11 that are included in the first array are identified as micro-optical elements 124a. A second array 127b of rotated micro-optical elements includes micro-optical elements arranged with their respective longitudinal axes 132 within the range of ±θ° relative to the second light input edge 212. Micro-optical elements shown in FIG. 11 that are included in the second array 127b are identified as micro-optical elements 124b. A third array 127c of rotated micro-optical elements includes micro-optical elements arranged with their respective longitudinal axes 132 within the range of ±θ° relative to the third light input edge 214. Micro-optical elements shown in FIG. 11 that are included in the third array 127c are identified as micro-optical elements 124c. Embodiments of the first array 127a of rotated micro-optical elements, the second array 127b of rotated micro-optical elements, and the third array 127c of rotated micro-optical elements are similar to the embodiments of the array 127 of rotated micro-optical elements discussed above with respect to FIGS. 1 and 4.

For each array 127a, 127b, 127c of rotated micro-optical elements, at least a portion of the micro-optical elements have a longitudinal axis that is non-parallel to the corresponding light input edge. Accordingly, for a path 240 extending from the first light input edge 210 along the light guide, at least one of the micro-optical elements 124a along the path is arranged with the longitudinal axis 132 thereof at a positive angle relative to the light input edge 210, and at least another one of the micro-optical elements 124a along the path is arranged with the longitudinal axis 132 thereof at a negative angle relative to the light input edge 210. For a path 242 extending from the second light input edge 212 along the light guide, at least one of the micro-optical elements 124b along the path is arranged with the longitudinal axis 132 thereof at a positive angle relative to the light input edge 212, and at least another one of the micro-optical elements 124b along the path is arranged with the longitudinal axis 132 thereof at a negative angle relative to the light input edge 212. For a path 244 extending from the third light input edge 214 along the light guide, at least one of the micro-optical elements 124c along the path is arranged with the longitudinal axis 132 thereof at a positive angle relative to the light input edge 214, and at least another one of the micro-optical elements 124c along the path is arranged with the longitudinal axis 132 thereof at a negative angle relative to the light input edge 214.

In some embodiments, the arrays 127a, 127b, 127c at least partially overlap. As an example, FIG. 11 shows that a location 220 proximate the center of the light guide 102 may include micro-optical elements from each of the arrays 127a, 127b, 127c. Other locations of the light guide may include micro-optical elements from only one of the arrays 127a, 127b, 127c. For example, at location 222 proximate the first light input edge 210, the light guide may only include micro-optical elements 124a from the first array 127a of rotated micro-optical elements. At location 224 proximate the second light input edge 212, the light guide may only include micro-optical elements 124b from the second array 127b of rotated micro-optical elements. At location 222 proximate the third light input edge 214, the light guide may only include micro-optical elements from the third array 127c of rotated micro-optical elements. In other embodiments, the arrays 127a, 127b, 127c may completely overlap so that micro-optical elements 124a, 124b, 124c of each of the arrays 127a, 127b, 127c are present at each of locations 222, 224, and 226.

Figure 12:
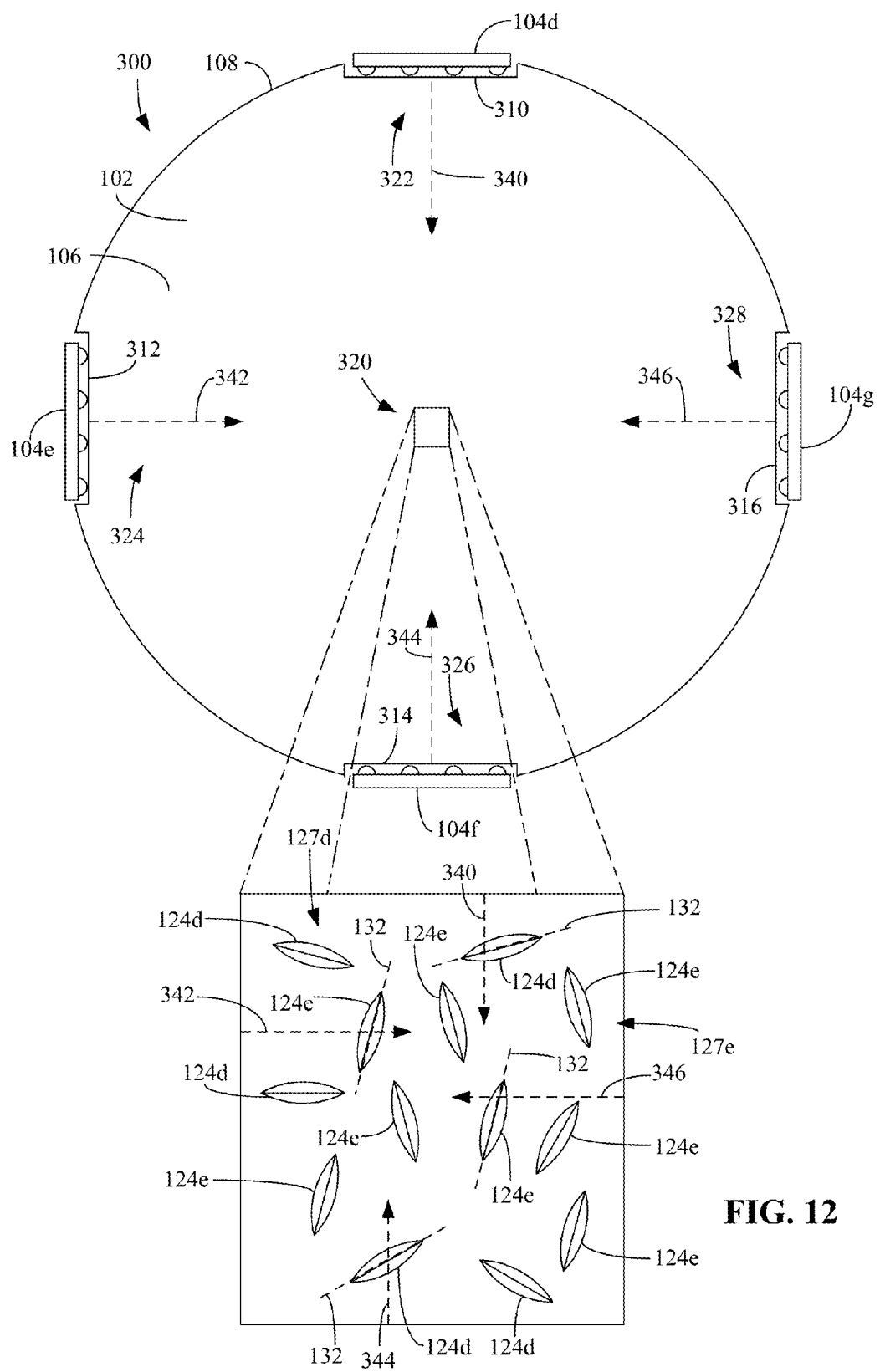

FIG. 12 shows another exemplary lighting assembly 300 including a light guide having more than one light input edge. The light guide 102 is similar to the light guide described in FIG. 11, but includes four light input edges 310, 312, 314, 316. The light input edges 310, 312, 314, 316 are spaced equally apart from one another around the perimeter such that each light input edge is arranged approximately 90° on the perimeter from another one of the light input edge. A light source 104d, 104e, 104f, 104g is respectively located adjacent to each light input edge. Each light source 104d, 104e, 104f, 104g may include similar features to the light source described above with respect to FIG. 1.

In the illustrated example, the light guide includes two arrays 127d, 127e of rotated micro-optical elements, each array corresponding to two of the respective light input edges. For example, a first array 127d of rotated micro-optical elements includes micro-optical elements arranged with their respective longitudinal axes 132 within the range of ±θ° relative to the first light input edge 310. The third light input edge 314 is opposite the first light input edge 310, and the first array 127d also corresponds to the third light input edge 314 such that micro-optical elements are arranged with their respective longitudinal axes 132 within the range of ±θ° relative to the third light input edge 314. Micro-optical elements shown in FIG. 12 that are included in the first array 127d are identified as micro-optical elements 124d. A second array 127e of rotated micro-optical elements includes micro-optical elements arranged with their respective longitudinal axes 132 within the range of ±θ° relative to the second light input edge 312. The fourth light input edge 316 is opposite the first light input edge 312, and the second array 127e also corresponds to the fourth light input edge 314 such that micro-optical elements are arranged with their respective longitudinal axes 132 within the range of ±θ° relative to the fourth light input edge 316. Micro-optical elements shown in FIG. 11 that are included in the second array 127e are identified as micro-optical elements 124e. Embodiments of the first array 127d of rotated micro-optical elements and the second array 127e of rotated micro-optical elements are similar to the embodiments of the array of rotated micro-optical elements discussed above with respect to FIGS. 1 and 4.

For each array 127d, 127e of rotated micro-optical elements, at least a portion of the micro-optical elements included therein have a longitudinal axis that is non-parallel to the corresponding light input edge. Accordingly, for a path 340 extending from the first light input edge 310 along the light guide, at least one of the micro-optical elements 124d along the path is arranged with the longitudinal axis 132 thereof at a positive angle relative to the light input edge 310, and at least another one of the micro-optical elements 124d along the path is arranged with the longitudinal axis 132 thereof at a negative angle relative to the light input edge 310. Similarly, for a path 344 extending from the third light input edge 314 along the light guide, at least one of the micro-optical elements 124d along the path is arranged with the longitudinal axis 132 thereof at a positive angle relative to the light input edge 310, and at least another one of the micro-optical elements 124d along the path is arranged with the longitudinal axis 132 thereof at a negative angle relative to the light input edge 310. For a path 342 extending from the second light input edge 312 along the light guide, at least one of the micro-optical elements 124e along the path is arranged with the longitudinal axis 132 thereof at a positive angle relative to the second light input edge 312, and at least another one of the micro-optical elements 124e along the path is arranged with the longitudinal axis 132 thereof at a negative angle relative to the second light input edge 312. Similarly, for a path 346 extending from the fourth light input edge 314 along the light guide, at least one of the micro-optical elements 124e along the path is arranged with the longitudinal axis 132 thereof at a positive angle relative to the fourth light input edge 314, and at least another one of the micro-optical elements 124e along the path is arranged with the longitudinal axis 132 thereof at a negative angle relative to the fourth light input edge 314.

In some embodiments, the arrays 127d, 127e at least partially overlap. As an example, FIG. 12 shows that a location 320 proximate the center of the light guide 102 may include micro-optical elements from each of the first and second arrays 127d, 127e. Other locations of the light guide may include micro-optical elements from only one of the arrays. For example, at location 322 proximate the first light input edge 310 (and at location 326 proximate the third light input edge 314), the light guide may only include micro-optical elements 124d from the first array 127d of rotated micro-optical elements. At location 324 proximate the second light input edge 312 (and at location 328 proximate the fourth light input edge 316), the light guide may only include micro-optical elements 124e from the second array 127e of rotated micro-optical elements. In other embodiments, the arrays 127d, 127e may completely overlap so that micro-optical elements 124e and 124e of each of the arrays 127d, 127e are present at each of locations 322, 324, 326, and 328.

FIG. 13 shows another exemplary lighting assembly 400 including a light guide 102 having more than one light input edge. The light guide 102 is similar to the light guide described in FIG. 12, but includes curved light input edges 410, 412, 414, 416. The light input edges 410, 412, 414, 416 are spaced equally apart from one another around the perimeter such that each light input edge is arranged approximately 90° on the perimeter from another one of the light input edges. A light source 104h, 104i, 104j, 104k is respectively located adjacent to each light input edge. Each light source 104h, 104i, 104j, 104k may include similar features to the light source described above with respect to FIG. 1.

In the illustrated example, the light guide includes two arrays 127d, 127e of rotated micro-optical elements, each array corresponding to two of the respective light input edges. For example, a first array 127d of rotated micro-optical elements includes micro-optical elements arranged with their respective longitudinal axes 132 within the range of ±θ° relative to a tangent of a part (e.g., a midpoint) of the first light input edge 410. The third light input edge 414 is opposite the first light input edge 410, and the first array 127d also corresponds to the third light input edge 414 such that micro-optical elements are arranged with their respective longitudinal axes 132 within the range of ±θ° relative to a tangent of a part (e.g., a midpoint) of the third light input edge 414. Micro-optical elements shown in FIG. 13 that are included in the first array 127d are identified as micro-optical elements 124d. A second array 127e of rotated micro-optical elements includes micro-optical elements arranged with their respective longitudinal axes 132 within the range of ±θ° relative to a tangent of a part (e.g., a midpoint) of the second light input edge 412. The fourth light input edge 416 is opposite the first light input edge 412, and the second array 127e also corresponds to the fourth light input edge 414 such that micro-optical elements are arranged with their respective longitudinal axes 132 within the range of ±θ° relative to a tangent of a part (e.g., a midpoint) of the fourth light input edge 416. Micro-optical elements shown in FIG. 13 that are included in the second array 127e are identified as micro-optical elements 124e. Embodiments of the first array 127d of rotated micro-optical elements and the second array 127e of rotated micro-optical elements are similar to the embodiments of the array of rotated micro-optical elements discussed above with respect to FIGS. 1 and 4.

For each array 127d, 127e of rotated micro-optical elements, at least a portion of the micro-optical elements included therein have a longitudinal axis that is non-parallel to the tangent of a part of the corresponding light input edge. Accordingly, for a path 440 extending from the first light input edge 410 along the light guide, at least one of the micro-optical elements 124d along the path is arranged with the longitudinal axis 132 thereof at a positive angle relative to the tangent 411 of a part of the light input edge 410, and at least another one of the micro-optical elements 124d along the path is arranged with the longitudinal axis 132 thereof at a negative angle relative to the tangent 411 of a part of the light input edge 410. Similarly, for a path 444 extending from the third light input edge 414 along the light guide, at least one of the micro-optical elements 124d along the path is arranged with the longitudinal axis 132 thereof at a positive angle relative to the tangent 415 of a part of the light input edge 414, and at least another one of the micro-optical elements 124d along the path is arranged with the longitudinal axis 132 thereof at a negative angle relative to the tangent 415 of a part of the light input edge 414. For a path 442 extending from the second light input edge 412 along the light guide, at least one of the micro-optical elements 124e along the path is arranged with the longitudinal axis 132 thereof at a positive angle relative to the tangent 413 of a part of the second light input edge 412, and at least another one of the micro-optical elements 124b along the path is arranged with the longitudinal axis 132 thereof at a negative angle relative to the tangent 413 of a part of the second light input edge 412. Similarly, for a path 446 extending from the fourth light input edge 416 along the light guide, at least one of the micro-optical elements 124e along the path is arranged with the longitudinal axis 132 thereof at a positive angle relative to the tangent 417 of a part of the fourth light input edge 416, and at least another one of the micro-optical elements 124e along the path is arranged with the longitudinal axis 132 thereof at a negative angle relative to the tangent 417 of a part of the fourth light input edge 416.

In some embodiments, the arrays 127d, 127e at least partially overlap. As an example, FIG. 13 shows that a location 420 proximate the center of the light guide 102 may include micro-optical elements from each of the first and second arrays. Other locations of the light guide may include micro-optical elements from only one of the arrays 127d, 127e. For example, at location 422 proximate the first light input edge 410 (and at location 426 proximate the third light input edge 414), the light guide may only include micro-optical elements 124d from the first array 127d of rotated micro-optical elements. At location 424 proximate the second light input edge 412 (and at location 428 proximate the fourth light input edge 416), the light guide may only include micro-optical elements 124e from the second array 127e of rotated micro-optical elements. In other embodiments, the arrays 127d, 127e may completely overlap so that micro-optical elements 124d and 124e of each of the arrays are present at each of locations 422, 424, 426, and 428.

Figure 14:
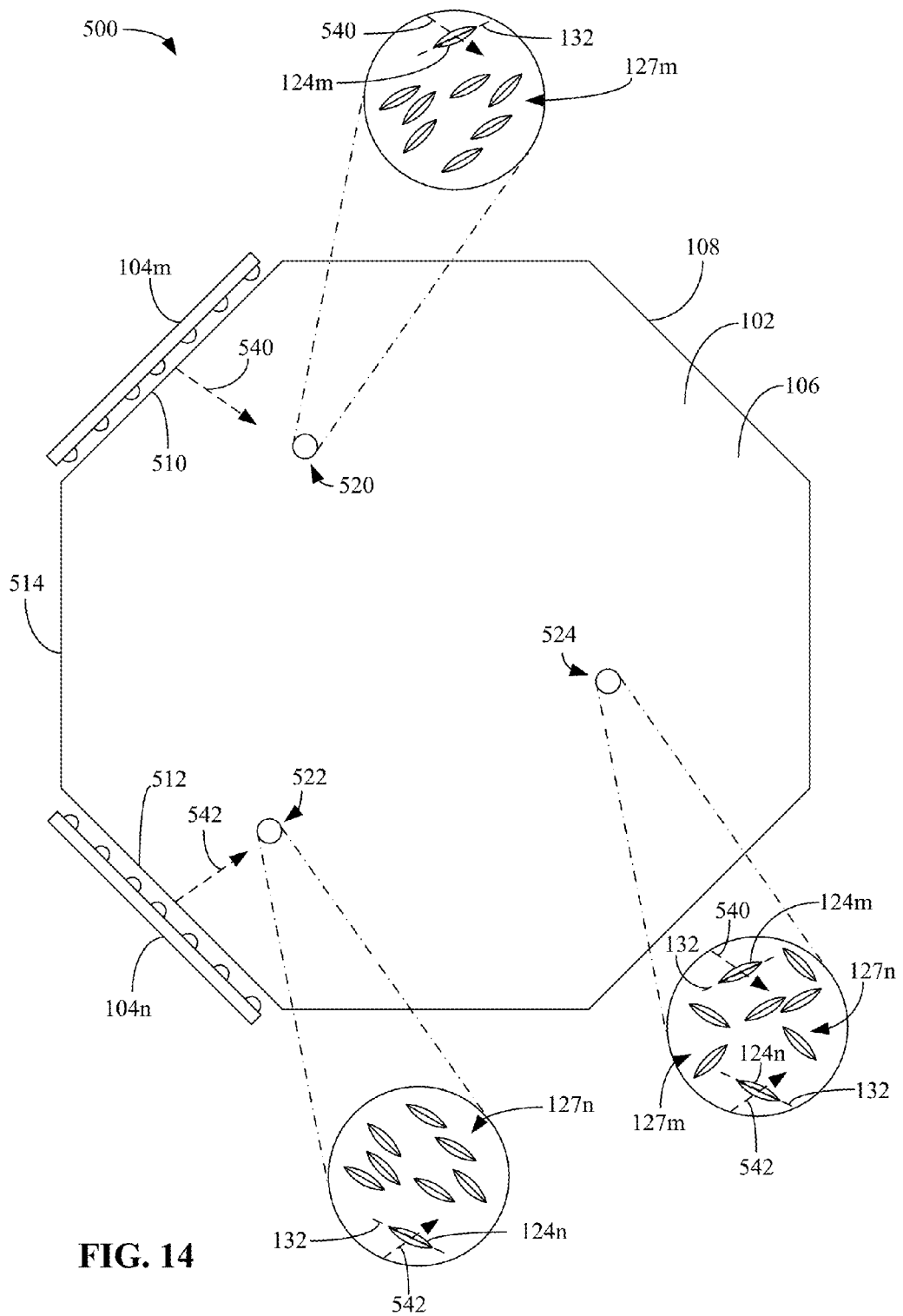

In the embodiments described above including more than one light input edge (FIGS. 11-13), the lighting assembly 200, 300, 400 may be configured such that the light output from the light guide is symmetrical. More specifically, the multiple light input edges in these embodiments of the lighting assembly 200, 300, 400 are arranged around the circumference of the light guide and relative to respective arrays of micro-optical elements such that the light may be output from the light guide in a symmetric manner in a plane parallel to the major surfaces of the light guide. FIG. 14 shows an exemplary embodiment of a lighting assembly 500 including a light guide having more than one light input edge in which the light guide is configured to output light therefrom in an asymmetric manner in a plane parallel to the major surfaces of the light guide.

The light guide 102 of FIG. 14 may include similar features to the light guide described above with respect to FIG. 1. The light guide 102 has the shape of an octagon and includes planar major surfaces 106, 108. The light guide 102 includes edge surfaces extending between the major surfaces 106, 108, the edge surfaces including a first light input edge 510 and a second light input edge 512. The light input edges 510, 512 are separated by edge surface 514 and are arranged such that a normal of light input edge 510 is arranged approximately 90° relative to a normal of the light input edge 512. A light source 104m, 104n is respectively located adjacent to each light input edge 510, 512. Each light source 104m, 104n may include similar features to the light source described above with respect to FIG. 1.

In the illustrated example, the light guide includes two arrays 127m, 127n of rotated micro-optical elements, each array corresponding to one of the respective light input edges 510, 512. For example, a first array 127m of rotated micro-optical elements includes micro-optical elements arranged with their respective longitudinal axes 132 within the range of ±θ° relative to the first light input edge 510. Micro-optical elements shown in FIG. 14 that are included in the first array are identified as micro-optical elements 124m. A second array 127n of rotated micro-optical elements includes micro-optical elements arranged with their respective longitudinal axes 132 within the range of ±θ° relative to the second light input edge 512. Micro-optical elements shown in FIG. 14 that are included in the second array 127n are identified as micro-optical elements 124n. Embodiments of the first array 127m of rotated micro-optical elements and the second array 127n of rotated micro-optical elements are similar to the embodiments of the array 127 of rotated micro-optical elements discussed above with respect to FIGS. 1 and 4.

For each array 127m, 127n of rotated micro-optical elements, at least a portion of the micro-optical elements have a longitudinal axis that is non-parallel to the corresponding light input edge. Accordingly, for a path 540 extending from the first light input edge 510 along the light guide, at least one of the micro-optical elements 124m along the path is arranged with the longitudinal axis 132 thereof at a positive angle relative to the light input edge 510, and at least another one of the micro-optical elements 124m along the path is arranged with the longitudinal axis 132 thereof at a negative angle relative to the light input edge 510. For a path 542 extending from the second light input edge 512 along the light guide, at least one of the micro-optical elements 124n along the path is arranged with the longitudinal axis 132 thereof at a positive angle relative to the light input edge 512, and at least another one of the micro-optical elements 124n along the path is arranged with the longitudinal axis 132 thereof at a negative angle relative to the light input edge 512.

At location 520 proximate the first light input edge 510, the light guide may only include micro-optical elements 124m from the first array 127m of rotated micro-optical elements. At location 522 proximate the second light input edge 512, the light guide may only include micro-optical elements 124n from the second array 127n of rotated micro-optical elements.

In some embodiments, the arrays 127m, 127n at least partially overlap. As an example, FIG. 14 shows that a location 524 distal the light input edges 510, 512 may include micro-optical elements from each of the arrays 127m, 127n. In other embodiments (not shown), a location 524 distal the light input edges 510, 512 may include a third array. In such embodiments, the arrays 127m, 127n may not be present at the location of the third array. In some examples, the third array may be an array of linearly oriented micro-optical elements, each micro-optical element having its longitudinal axis parallel to the edge surface 514. In other examples, the third array may be an array of rotated micro-optical elements, each micro-optical element arranged with its longitudinal axis 132 within the range of ±A° relative to the light input edge.

In some embodiments, the arrays 127m and 127n may be configured to influence the asymmetric output distribution of light from the light guide. As an example, for the lighting assembly 500 of FIG. 14, a greater percentage of optical elements in the array 127m may be rotated to have its longitudinal axis 132 closer to parallel to the edge surface 514 than the percentage of optical elements in the array 127m rotated to have its longitudinal axis 132 further from parallel to the edge surface 514. Similarly, a greater percentage of optical elements in the array 127n may be rotated to have its longitudinal axis 132 closer to parallel to the edge surface 514 than the percentage of optical elements in the array 127n rotated to have its longitudinal axis 132 further from parallel to the edge surface 514. Such configuration may influence the asymmetric output distribution of light from the light guide.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

What is claimed is:

1. A lighting assembly, comprising:
   a light guide to propagate light by total internal reflection, the light guide comprising opposed major surfaces and a light input edge extending between the major surfaces in a thickness direction through which light is input into the light guide;
   a light source located adjacent the light input edge to edge light the light guide; and
   an array of micro-optical elements of well-defined shape at at least one of the opposed major surfaces, the array of micro-optical elements corresponding to the light source, each of the micro-optical elements in the array configured as a three-dimensional feature recessed into or protruding from the major surface and comprising a longitudinal axis arranged within the range of +45° to −45° relative to the light input edge, wherein the range within which the longitudinal axes of the micro-optical elements at a given location are arranged relative to the light input edge decreases from the range of +45° to −45° with increasing distance from the light input edge such that the range within which the longitudinal axes of the micro-optical elements are arranged relative to the light input edge at a first location proximate the light input edge is greater than the range within which the longitudinal axes of the micro-optical elements are arranged relative to the light input edge at a second location of the light guide further from the light input edge than the first location,
   wherein a path linearly extending along the light guide from the light input edge and orthogonal to the light input edge intersects a portion of the micro-optical elements in the array, at least one of the micro-optical elements along the path arranged with the longitudinal axis thereof at a positive angle relative to the light input edge, and at least another one of the micro-optical elements along the path arranged with the longitudinal axis thereof at a negative angle relative to the light input edge.

2. The lighting assembly of claim 1, wherein the longitudinal axis of each of the micro-optical elements in the array is arranged within the range of +30° to −30° relative to the light input edge, and the range within which the longitudinal axes of the micro-optical elements at a given location are arranged relative to the light input edge decreases from the range of +30° to −30° with increasing distance from the light input edge.

3. The lighting assembly of claim 1, wherein the longitudinal axis of each of the micro-optical elements in the array is arranged within the range of +15° to −15° relative to the light input edge, and the range within which the longitudinal axes of the micro-optical elements at a given location are arranged relative to the light input edge decreases from the range of +15° to −15° with increasing distance from the light input edge.

4. The lighting assembly of claim 1, wherein a portion of the micro-optical elements are respectively arranged with the longitudinal axis thereof nominally parallel to the light input edge.

5. The lighting assembly of claim 1, wherein a percentage of the micro-optical elements that are arranged at an angle relative to the light input edge from among the micro-optical elements present at a given location of the light guide decreases with increasing distance from the light input edge such that a percentage of the micro-optical elements that are arranged at an angle relative to the light input edge from among the micro-optical elements present at the first location proximate the light input edge is greater than a percentage of the micro-optical elements that are arranged at an angle relative to the light input edge from among the micro-optical elements present at the second location of the light guide further from the light input edge than the first location.

6. The lighting assembly of claim 1, wherein at least a portion of the micro-optical elements each comprise a first surface intersecting the major surface and a second surface intersecting the major surface, the second surface additionally intersecting the first surface to form an arcuate ridge extending along the longitudinal axis of the micro-optical element and that additionally intersects the major surface at both of its ends, the arcuate ridge extending parallel to the longitudinal axis of the micro-optical element.

7. The lighting assembly of claim 1, wherein:
   the micro-optical elements in the array of micro-optical elements at the first location proximate the light input edge are arranged within the range of +30° to −30° relative to the light input edge;
   the micro-optical elements in the array of micro-optical elements at the second location further from the light input edge than the first location are arranged within the range of +15° to −15° relative to the light input edge; and the micro-optical elements in the array of micro-optical elements at a third location further from the light input edge than the first and the second locations are arranged within the range of +10° to −10° relative to the light input edge.

8. The lighting assembly of claim 1, wherein the array of micro-optical elements is configured to output light from the light guide with a horizontal beam angle within 10° of a horizontal beam angle of light output from a corresponding linear array of micro-optical elements, each micro-optical element in the linear array comprising a longitudinal axis arranged parallel to the light input edge.

9. The lighting assembly of claim 1, wherein a percentage of the micro-optical elements that are arranged at an angle relative to the light input edge from among the micro-optical elements present at a given location of the light guide is nominally the same as a percentage of the micro-optical elements that are arranged at an angle relative to the light input edge from among the micro-optical elements present at other locations of the light guide closer to and further from the light input edge.

10. The lighting assembly of claim 1, wherein
the light guide further comprises an edge surface opposite the light input edge; and
the range within which the longitudinal axes of the micro-optical elements at a given location are arranged relative to the light input edge decreases from the range of +45° to −45° with increasing distance from the light input edge to the edge surface opposite the light input edge.

11. A light guide, comprising:
opposed major surfaces between which light propagates by total internal reflection;
a light input edge extending between the major surfaces in a thickness direction through which light is input into the light guide; and
an array of micro-optical elements of well-defined shape at at least one of the opposed major surfaces, the array of micro-optical elements corresponding to the light input edge, each of the micro-optical elements in the array configured as a three-dimensional feature recessed into or protruding from the major surface and comprising a longitudinal axis arranged within the range of +45° to −45° relative to the light input edge, wherein the range within which the longitudinal axes of the micro-optical elements at a given location are arranged relative to the light input edge decreases from the range of +45° to −45° with increasing distance from the light input edge such that the range within which the longitudinal axes of the micro-optical elements are arranged relative to the light input edge at a first location proximate the light input edge is greater than the range within which the longitudinal axes of the micro-optical elements are arranged relative to the light input edge at a second location of the light guide further from the light input edge than the first location,
wherein a path linearly extending along the light guide from the light input edge and orthogonal to the light input edge intersects a portion of the micro-optical elements in the array, at least one of the micro-optical elements along the path arranged with the longitudinal axis thereof at a positive angle relative to the light input edge, and at least another one of the micro-optical elements along the path arranged with the longitudinal axis thereof at a negative angle relative to the light input edge.

12. The light guide of claim 11, wherein the longitudinal axis of each of the micro-optical elements in the array is arranged within the range of +30° to −30° relative to the light input edge, and the range within which the longitudinal axes of the micro-optical elements at a given location are arranged relative to the light input edge decreases from the range of +30° to −30° with increasing distance from the light input edge.

13. The light guide of claim 11, wherein the longitudinal axis of each of the micro-optical elements in the array is arranged within the range of +15° to −15° relative to the light input edge, and the range within which the longitudinal axes of the micro-optical elements at a given location are arranged relative to the light input edge decreases from the range of +15° to −15° with increasing distance from the light input edge.

14. The light guide of claim 11, wherein a portion of the micro-optical elements are respectively arranged with the longitudinal axis thereof nominally parallel to the light input edge.

15. The light guide of claim 11, wherein a percentage of the micro-optical elements that are arranged at an angle relative to the light input edge from among the micro-optical elements present at a given location of the light guide decreases with increasing distance from the light input edge such that a percentage of the micro-optical elements that are arranged at an angle relative to the light input edge from among the micro-optical elements present at the first location proximate the light input edge is greater than a percentage of the micro-optical elements that are arranged at an angle relative to the light input edge from among the micro-optical elements present at the second location of the light guide further from the light input edge than the first location.

16. The light guide of claim 11, wherein at least a portion of the micro-optical elements each comprise a first surface intersecting the major surface and a second surface intersecting the major surface, the second surface additionally intersecting the first surface to form an arcuate ridge extending along the longitudinal axis of the micro-optical element and that additionally intersects the major surface at both of its ends.

17. The light guide of claim 11, wherein:
the micro-optical elements in the array of micro-optical elements at the first location proximate the light input edge are arranged within the range of +30° to −30° relative to the light input edge;
the micro-optical elements in the array of micro-optical elements at the second location further from the light input edge than the first location are arranged within the range of +15° to −15° relative to the light input edge; and
the micro-optical elements in the array of micro-optical elements at a third location further from the light input edge than the first and the second locations are arranged within the range of +10° to −10° relative to the light input edge.

18. The light guide of claim 11, wherein a percentage of the micro-optical elements that are arranged at an angle relative to the light input edge from among the micro-optical elements present at a given location of the light guide is nominally the same as a percentage of the micro-optical elements that are arranged at an angle relative to the light input edge from among the micro-optical elements present at other locations of the light guide closer to and further from the light input edge.

19. The light guide of claim 11, wherein
the light guide further comprises an edge surface opposite the light input edge; and
the range within which the longitudinal axes of the micro-optical elements at a given location are arranged relative to the light input edge decreases from the range of +45° to −45° with increasing distance from the light input edge to the edge surface opposite the light input edge.

20. A lighting assembly, comprising:
a light guide to propagate light by total internal reflection, the light guide comprising opposed major surfaces and a light input edge extending between the major surfaces in a thickness direction through which light is input into the light guide, a tangent of at least part of the light input edge extending in a direction orthogonal to the thickness direction;
a light source located adjacent the light input edge to edge light the light guide; and
an array of micro-optical elements of well-defined shape at at least one of the opposed major surfaces, the array of micro-optical elements corresponding to the light source, each of the micro-optical elements in the array configured as a three-dimensional feature recessed into or protruding from the major surface and comprising a longitudinal axis arranged within the range of +45° to −45° relative to the tangent of the light input edge, wherein the range within which the longitudinal axes of the micro-optical elements at a given location are arranged relative to the tangent of the light input edge decreases from the range of +45° to −45° with increasing distance from the light input edge such that the range within which the longitudinal axes of the micro-optical elements are arranged relative to the tangent of the light input edge at a first location proximate the light input edge is greater than the range within which the longitudinal axes of the micro-optical elements are arranged relative to the tangent of the light input edge at a second location of the light guide further from the light input edge than the first location,
wherein a path linearly extending along the light guide from the light input edge and orthogonal to the tangent of the light input edge intersects a portion of the micro-optical elements of the array, at least one of the micro-optical elements along the path arranged with the longitudinal axis thereof at a positive angle relative to the tangent of the light input edge, and at least another one of the micro-optical elements along the path arranged with the longitudinal axis thereof at a negative angle relative to the tangent of the light input edge.

* * * * *